(12) United States Patent
Page

(10) Patent No.: US 9,669,586 B2
(45) Date of Patent: Jun. 6, 2017

(54) MATERIAL DISPENSING SYSTEM

(71) Applicant: Autodesk, Inc., San Rafael, CA (US)

(72) Inventor: James Sherwood Page, Oakland, CA (US)

(73) Assignee: Autodesk, Inc., San Rafael, CA (US)

( * ) Notice: Subject to any disclaimer, the term of this patent is extended or adjusted under 35 U.S.C. 154(b) by 402 days.

(21) Appl. No.: 14/501,896

(22) Filed: Sep. 30, 2014

(65) Prior Publication Data

US 2015/0093465 A1    Apr. 2, 2015

Related U.S. Application Data

(60) Provisional application No. 61/885,011, filed on Oct. 1, 2013.

(51) Int. Cl.
*B29C 67/00* (2017.01)
*B29C 47/36* (2006.01)
(Continued)

(52) U.S. Cl.
CPC ...... *B29C 67/0088* (2013.01); *B29C 47/0014* (2013.01); *B29C 47/0064* (2013.01);
(Continued)

(58) Field of Classification Search
CPC ............ B29C 67/0055; B29C 67/0088; B29C 67/0059; B29C 67/0085; B29C 47/0064;
(Continued)

(56) References Cited

U.S. PATENT DOCUMENTS

| 5,303,141 A | 4/1994 | Batchelder et al. |
| 5,316,219 A | 5/1994 | Christyson et al. |

(Continued)

FOREIGN PATENT DOCUMENTS

DE    10 2011 119 735    6/2013

OTHER PUBLICATIONS

*3-way extruder and colour blending nozzle Part 2—Build up and Printed things.* YouTube. Published Aug. 23, 2012. Retrieved on Sep. 10, 2014. Retrieved from the Internet: URL<http://www.youtube.com/watch?v=nkkbjpHVNZQ>. 2 pages.

(Continued)

*Primary Examiner* — Alison L Hindenlang
*Assistant Examiner* — Emmanuel S Luk
(74) *Attorney, Agent, or Firm* — Fish & Richardson P.C.

(57) ABSTRACT

Additive manufacturing systems and apparatus include, in one aspect, a material deposition system including an extruder for deposition materials, the extruder including two or more material entry ports, a mixing chamber, and an exit orifice; and a controller coupled with the extruder to dynamically change delivery rates of the deposition materials to be mixed in the mixing chamber before flowing from the exit orifice; wherein the controller combines a desired volume flow rate of material to flow from the exit orifice with a mix ratio to specify the delivery rates of the deposition materials. The system can include filament drive systems to feed the thermoplastic materials in filament form into the entry ports, and the controller can dynamically change the mix ratio when operating the filament drive systems to control one or more properties of the material to flow from the exit orifice.

15 Claims, 25 Drawing Sheets

(51) Int. Cl.
| | |
|---|---|
| *B29C 47/00* | (2006.01) |
| *B29C 47/02* | (2006.01) |
| *B29C 47/92* | (2006.01) |
| *B33Y 10/00* | (2015.01) |
| *B33Y 50/02* | (2015.01) |
| *B29K 101/12* | (2006.01) |

(52) U.S. Cl.
CPC ............ *B29C 47/026* (2013.01); *B29C 47/92* (2013.01); *B29C 67/0055* (2013.01); *B33Y 10/00* (2014.12); *B33Y 50/02* (2014.12); *B29C 2947/9258* (2013.01); *B29C 2947/92571* (2013.01); *B29C 2947/92904* (2013.01); *B29K 2101/12* (2013.01); *B29K 2995/0013* (2013.01)

(58) Field of Classification Search
CPC .............. B29C 47/0014; B29C 47/026; B29C 2947/92571; B29C 2974/92904
USPC .................................. 366/59, 204, 205, 341
See application file for complete search history.

(56) References Cited

U.S. PATENT DOCUMENTS

| | | | |
|---|---|---|---|
| 5,943,235 A | 8/1999 | Earl et al. | |
| 5,960,411 A | 9/1999 | Hartman et al. | |
| 5,979,794 A * | 11/1999 | DeFillipi | B01F 15/0462 |
| | | | 222/145.6 |
| 6,129,872 A * | 10/2000 | Jang | B29C 41/36 |
| | | | 264/245 |
| 6,722,872 B1 | 4/2004 | Swanson et al. | |
| 6,749,414 B1 | 6/2004 | Hanson et al. | |
| 6,814,907 B1 | 11/2004 | Comb | |
| 7,122,246 B2 | 10/2006 | Comb et al. | |
| 7,754,807 B2 | 7/2010 | Priedeman, Jr. et al. | |
| 8,512,024 B2 * | 8/2013 | Pax | B29C 47/0014 |
| | | | 226/181 |
| 9,339,974 B2 | 5/2016 | Spalt | |
| 9,486,960 B2 * | 11/2016 | Paschkewitz | B29C 67/0085 |
| 9,550,319 B2 * | 1/2017 | Larsen | B29C 47/12 |
| 2001/0017085 A1 | 8/2001 | Kubo et al. | |
| 2005/0015173 A1 * | 1/2005 | Ohmori | B29C 67/0088 |
| | | | 700/119 |
| 2009/0020906 A1 * | 1/2009 | Neumann | B29C 47/0014 |
| | | | 264/176.1 |
| 2010/0021580 A1 | 1/2010 | Swanson et al. | |
| 2010/0100224 A1 | 4/2010 | Comb et al. | |
| 2011/0059256 A1 | 3/2011 | Ebisawa | |
| 2011/0079936 A1 | 4/2011 | Oxman | |
| 2012/0018924 A1 * | 1/2012 | Swanson | B29C 47/0014 |
| | | | 264/401 |
| 2014/0034214 A1 | 2/2014 | Boyer et al. | |
| 2014/0070461 A1 | 3/2014 | Pax | |
| 2014/0183792 A1 * | 7/2014 | Leu | B29C 47/0071 |
| | | | 264/401 |
| 2014/0277661 A1 * | 9/2014 | Amadio | B29C 67/0088 |
| | | | 700/97 |
| 2014/0284832 A1 * | 9/2014 | Novikov | B29C 67/0088 |
| | | | 264/40.1 |
| 2014/0291886 A1 | 10/2014 | Mark et al. | |
| 2014/0328963 A1 | 11/2014 | Mark et al. | |
| 2014/0361460 A1 | 12/2014 | Mark | |
| 2014/0363532 A1 * | 12/2014 | Wolfgram | B29C 67/0085 |
| | | | 425/113 |
| 2015/0108677 A1 | 4/2015 | Mark et al. | |
| 2015/0142159 A1 * | 5/2015 | Chang | B29C 67/0059 |
| | | | 700/119 |
| 2015/0183161 A1 * | 7/2015 | Molinari | B29C 67/0085 |
| | | | 425/375 |
| 2015/0251357 A1 * | 9/2015 | Jin | B29C 67/0088 |
| | | | 700/119 |
| 2015/0266235 A1 | 9/2015 | Page | |
| 2015/0266244 A1 | 9/2015 | Page | |
| 2015/0324490 A1 | 11/2015 | Page | |
| 2015/0352787 A1 * | 12/2015 | Humbert | B29C 67/0055 |
| | | | 264/489 |
| 2015/0367375 A1 | 12/2015 | Page | |
| 2015/0367576 A1 | 12/2015 | Page | |
| 2015/0375451 A1 * | 12/2015 | Voris | B29C 67/0055 |
| | | | 264/78 |
| 2016/0075089 A1 * | 3/2016 | Duro Royo | B29C 67/0088 |
| | | | 264/308 |
| 2016/0129644 A1 * | 5/2016 | Hara | B29C 67/0088 |
| | | | 264/176.1 |
| 2016/0303347 A1 * | 10/2016 | Porter | B29C 47/028 |
| 2016/0332382 A1 * | 11/2016 | Coward | B29B 7/38 |

OTHER PUBLICATIONS

*CubePro 3D Printer.* CubePro. Published Jan. 6, 2014. Retrieved on Sep. 10, 2014. Retrieved from the Internet: URL<http://cubify.com/en/CubePro?gclid=CJbWgJiz1cACFUiGfgod7zgA6A>. 9 pages.
Douglass, Carl. *Next Generation 3D Printer Extruders: The Rugged-HPX Line.* Kickstarter. Published Feb. 17, 2014. Retrieved on Sep. 10, 2014. Retrieved from the Internet: URL<https://www.kickstarter.com/projects/dglass3d/next-generation-3d-printer-extruders-the-rugged-hp>. 22 pages.
*MakerBot Replicator 2X.* MakerBot. Published Sep. 18, 2012. Retrieved on Sep. 10, 2014. Retrieved from the Internet: URL< http://store.makerbot.com/replicator2x>. 9 pages.
*Multicolor-extruder.* RepRap. Published Aug. 11, 2014. Retrieved on Sep. 10, 2014. Retrieved from the Internet: URL< http://reprap.org/wiki/Multicolor-extruder>. 3 pages.
*RepRap 3D printer 3-way extruder and colour blending nozzle Part 1—intro video.* YouTube. Published Aug. 23, 2012. Retrieved on Sep. 10, 2014. Retrieved from the Internet: URL<http://www.youtube.com/watch?v=_g0fiWx8RyM>. 3 pages.
*RUG/Pennsylvania/State College/Software/Parts/Dual Extruder.* PepRap. Published Aug. 6, 2014. Retrieved on Sep. 10, 2014. Retrieved from the Internet: URL <http://reprap.org/wiki/RUG/Pennsylvania/State_College/Software/Parts/Dual_Extruder>. 13 pages.
Neri Oxman, U.S. Appl. No. 61/248,555, "Variable Property Rapid Prototyping (VPRP)," filed Oct. 5, 2009, 36 pages.
"Nike Air Huarache Run ID Shoe," [online] [Retrieved on Jan. 28, 2015]; Retrieved from the Internet URL: http://store.nike.com/us/en_us/product/air-huarache-run-id/?piid=39329&pbid=712882438, 6 pages.
"Style sheet (web development)," [online] [Retrieved on Jan. 28, 2015]; Retrieved from the Internet URL: http://en.wikipedia.org/wiki/Style_sheet_(web_development), 4 pages.
"T-shirt," [online] [Retrieved on Jan. 28, 2015]; Retrieved from the Internet URL: http://en.wikipedia.org/wiki/T-shirt, 7 pages.
"Upload your 3D Design," [online] [Retrieved on Jan. 28, 2015]; Retrieved from the Internet URL:http://www.shapeways.com/create?li=home-2ndPring-promo-create, 8 pages.
"3D printing," [online] [Retrieved on Jan. 28, 2015]; Retrieved from the Internet URL: http://en.wikipedia.org/wiki/3D_printing, 39 pages.
"3D Printer Software & Apps," [online] [Retrieved on Jan. 28, 2015]; Retrieved from the Internet URL: https://3dprinter.dremel.com/3d-printer-software-apps, 11 pages.
"How Shapeways 3D Printing Works," [online] [Retrieved on Jan. 28, 2015]; Retrieved from the Internet URL: http://www.shapeways.com/how-shapeways-works, 14 pages.
Moto X (1st generation), [online] [Retrieved on Jan. 28, 2015]; Retrieved from the Internet URL: http://en.wikipedia.org/wiki/Moto_X_(1st_generation), 10 pages.

* cited by examiner

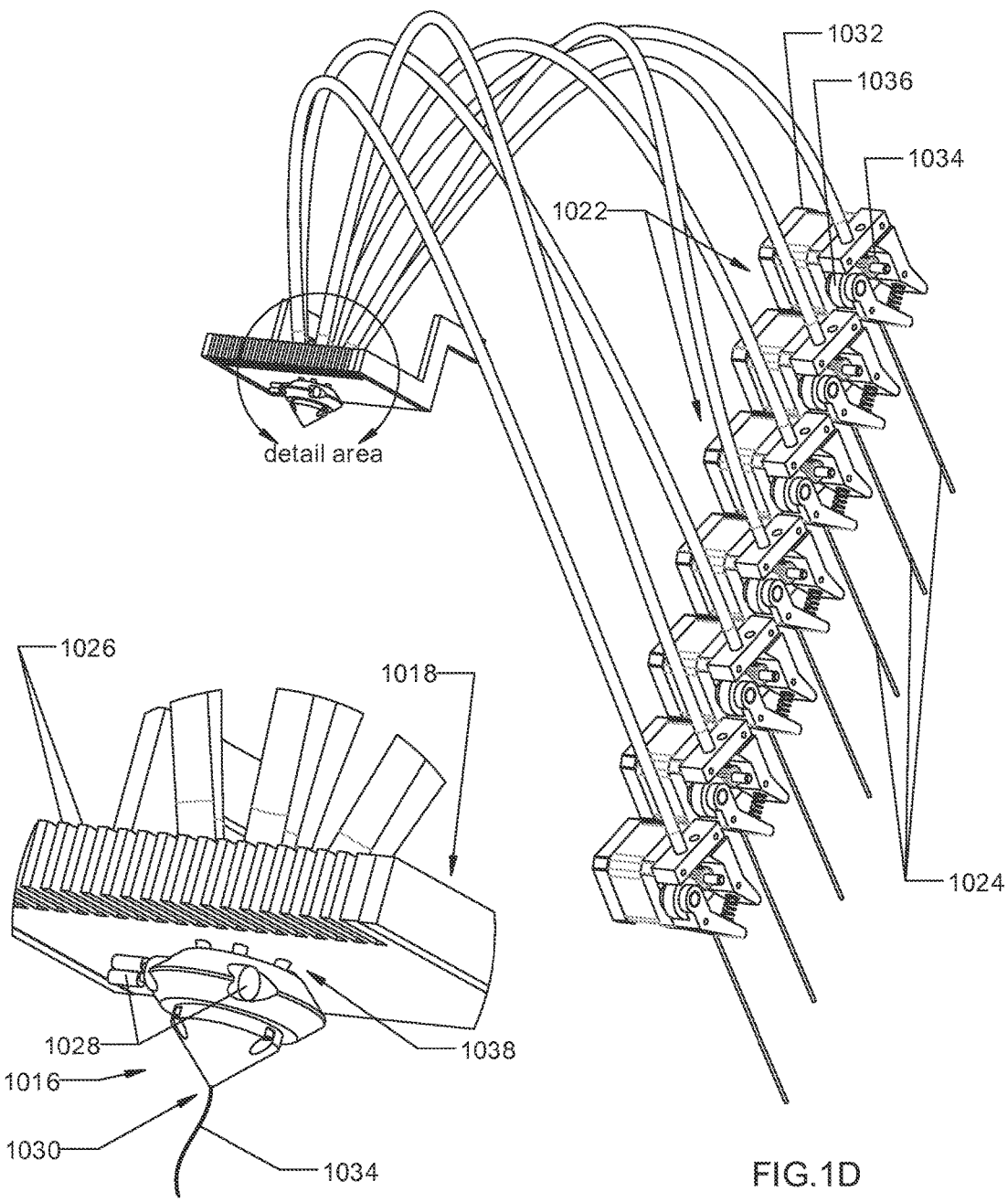

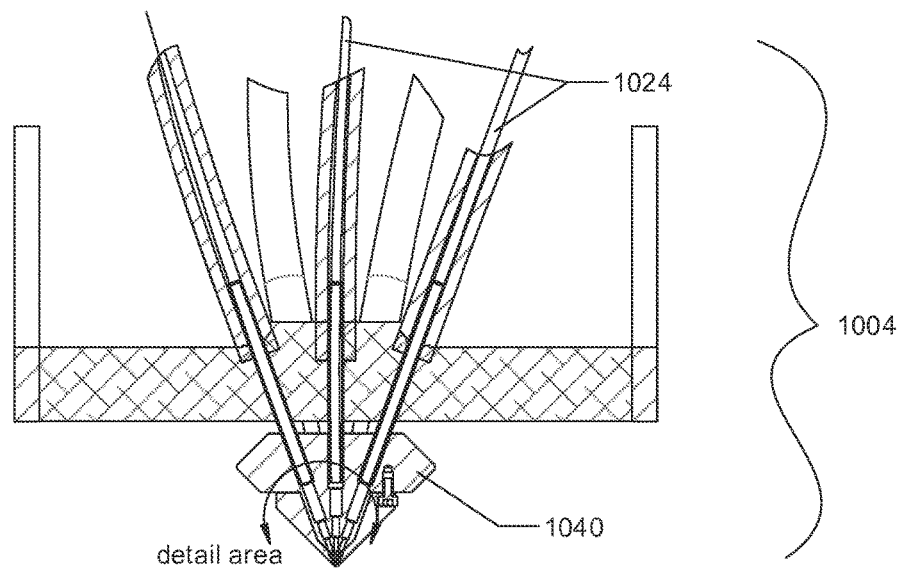
FIG.1F
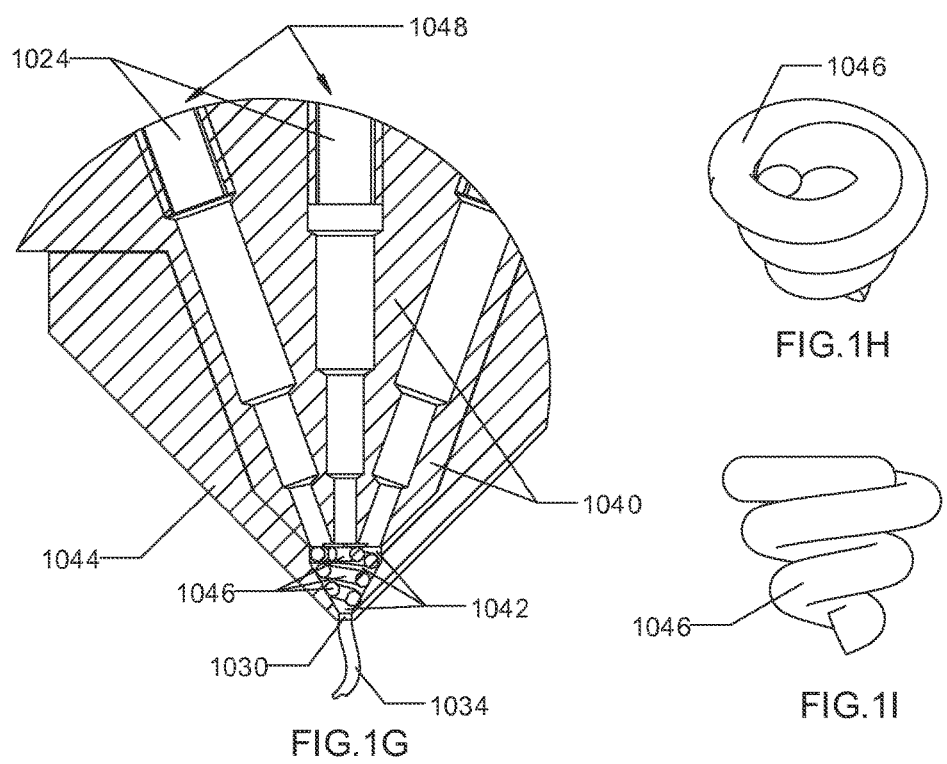
FIG.1G
FIG.1H
FIG.1I

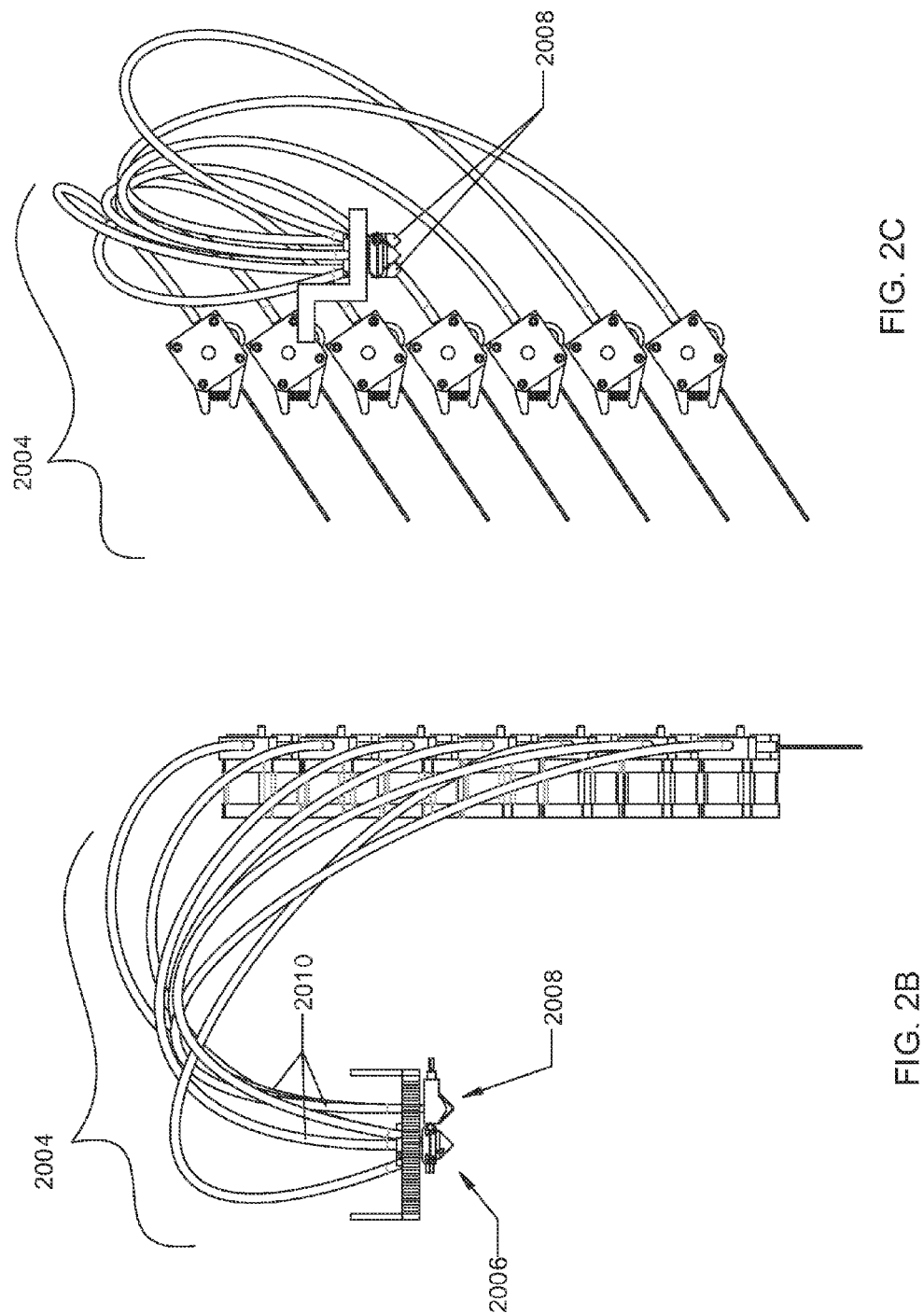

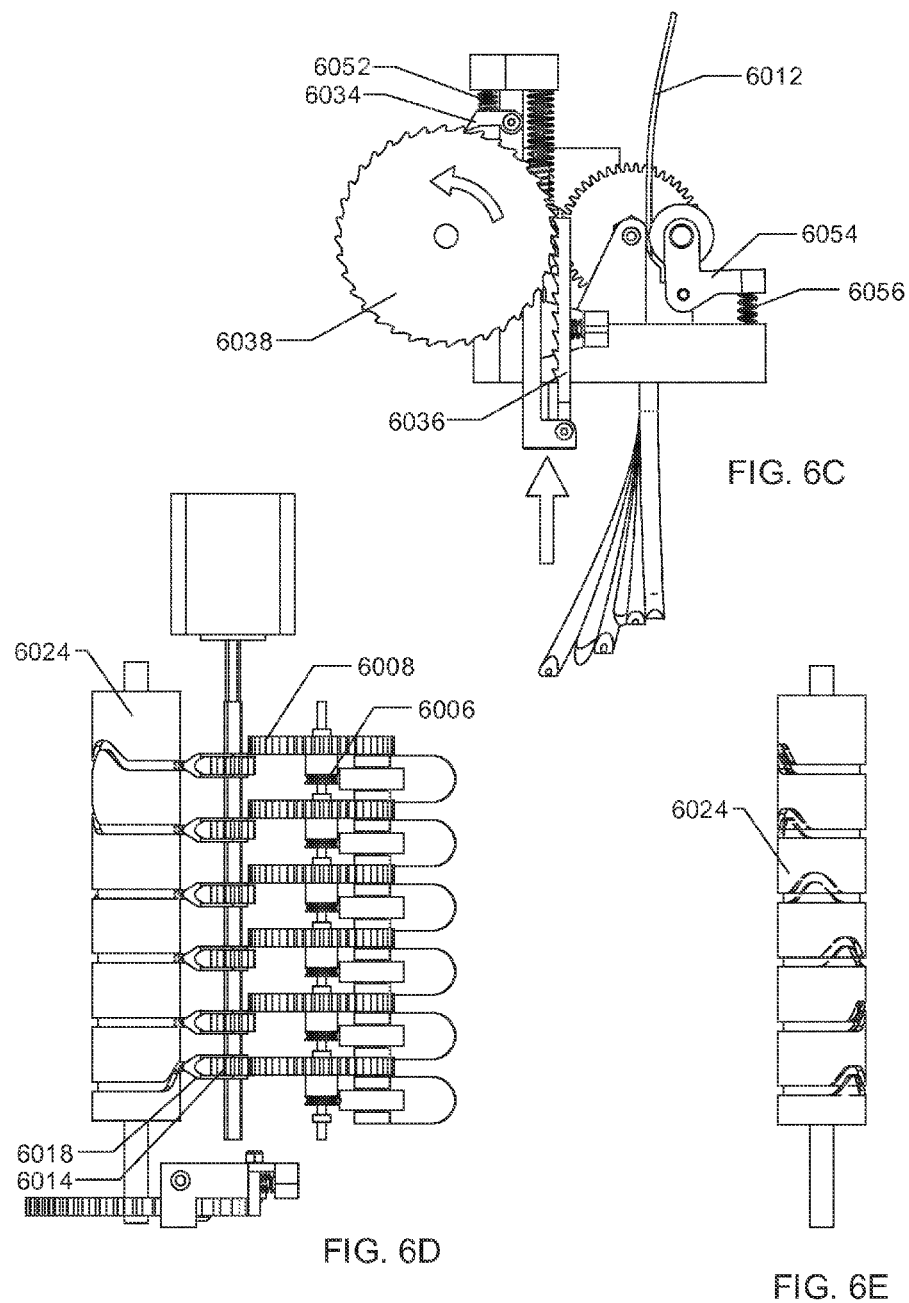

MATERIAL DISPENSING SYSTEM

CROSS-REFERENCE TO RELATED APPLICATIONS

This application claims the benefit under 35 U.S.C. §119 (e) of U.S. Patent Application No. 61/885,011, entitled "Material Dispensing System," filed Oct. 1, 2013, which is hereby incorporated by reference.

BACKGROUND

This specification relates to three dimensional (3D) printing or additive manufacturing, such as fused deposition modeling (FDM).

FDM using extruded polymer filament has evolved rapidly and is extremely useful for creating reasonably accurate three dimensional objects quickly. Current FDM printing is typically accomplished by forcing a solid plastic feedstock through a heated nozzle with smaller diameter than the original feedstock. The filament is liquefied before or as it passes through the constriction in the nozzle, and the feed pressure causes material to be extruded with a cross section approximately equal to the nozzle exit.

SUMMARY

This specification describes technologies relating to 3D printing (additive manufacturing) such as FDM.

Particular embodiments of the subject matter described in this specification can be implemented to realize one or more of the following advantages. Additive manufacturing technology can be made more useful and applicable to a wider variety of applications by improving several factors. Different colors, different materials, or both can be efficiently and accurately mixed to produce higher quality 3D prints in less time. An FDM system need not be limited to one or two print nozzles and therefore one or two materials. Multiple nozzle and extrusion sizes can be used with 3D printing. Moreover, different colors or materials can be used without a need to constantly change material spools.

In some implementations, multiple nozzles can be used to improve attributes of 3D printing, such as increasing speed, matching feature size to filament size and extrusion size, improving part strength, using multiple colors in the same print, printing a support material, printing different materials, etc. A significant benefit of multiple nozzles can be that one of the nozzles can be configured to print with a significantly larger filament, which can fill the interior spaces of models much quicker than filament extruded from a small nozzle. Heat transfer can be increased with higher nozzle temperature, but the nozzle temperature has a maximum that can be used without burning the plastic on the outside of the filament. If material is moved through the nozzle too quickly, the center of the filament won't be properly liquefied and poor print quality may result. A solution that will allow faster feeding of material through a large nozzle with complete liquefication is a system that uses multiple filaments feeding into a larger final nozzle aperture. In addition, a problem of a traditional FDM nozzle arrangement, where larger filaments cannot be fed as quickly because heat transfer to the center is slower than for smaller filaments, can be addressed.

Another use of multiple nozzles is to print multiple colors in the same part. This is fairly straight forward, but it has the potential consequence that the moving print head assembly (also called a nozzle or extruder assembly) gains mass in proportion to the number of print nozzles. It should be noted that each print nozzle typically needs its own feed motor which adds the majority of the mass. Adding mass can result in a proportional reduction in the acceleration that can be created by the drive motors, and a related decrease in print speed if X and/or Y axes operate by moving the printhead and/or increased system deflection, vibration and reductions in print quality. Many parts require frequent direction changes, especially to create the infill which is often a raster pattern. Reduced acceleration can dramatically increase part build time. Increasing print head mass without reducing acceleration can dramatically reduce part quality.

In some implementations, a system is able to selectively drive filaments for multiple nozzles with a single drive motor so as to allow multiple nozzles for multiple colors. There are various ways to accomplish switching of which nozzle is being driven by the drive motor. One way is to use a mechanism that indexes when reverse motion of the drive motor exceeds a certain amount. An initial reverse motion would cause reverse motion or pullback of the currently active filament or nozzle. Continued reverse motion would index the system to control of the next nozzle. The system can be arranged so that continued reverse motion continues to index even further to the next nozzle still, and then after cycling through all the available nozzles, finally indexing back to the first nozzle. This system can be arranged so that cycles of motion forward to extrude from a given nozzle do not cause indexing of nozzle control. Also, it can be arranged so that cycles of forward drive motion plus small backward drive movements do not cause control indexing.

Another method of indexing nozzle control uses motion of the other axes (X or Y or Z, or other axes, or some combination of these) to affect a change of nozzle control as is shown in FIG. 3A. For example, driving the system to a certain X,Y location which is outside of the normal build area and then driving one of the axes further or to a specific location can impart force or displacement to a mechanism that switches the driving transmission to a different nozzle. Different locations or switch mechanisms may be used to index nozzle control forward or backward. Or the mechanism may be arranged to index in a continuous cyclic fashion so that only one direction of indexing is needed. Nozzles may stay at fixed locations relative to the moving print head base or nozzles may move into a driven position as control is indexed.

According to some embodiments, as shown in FIGS. 2A and 2B, filament drive motors can be mounted remotely to the chassis of the machine, rather than mounted to the head, and the filament drive motors can drive filaments from the remote location. Another approach is shown in FIGS. 5A-5C, which allows multiple filaments (or multiple nozzles) and can reduce the mass of the moving head assembly and also avoid adding elasticity to the filament drive systems. Such embodiments can use one or more remote filament drive motors, but leave the actual filament drive systems at the nozzles. The torque from the drive motors can be coupled to the filament drive systems via flexible shafts. Optionally, the system in FIG. 3A can be combined with the flexible drive shaft system so that both the mass of the printhead is reduced and a single filament drive motor can selectively drive multiple nozzles.

Some embodiments use a filament drive motor attached to the machine chassis so that moving printhead mass is reduced. Two flexible drive shafts can transfer rotary motion and torque from the filament drive motor to the filament drive mechanism at the moving nozzles. Two counter-rotating shafts can be used so that no reaction torque is required from the moving printhead or chassis structure. It may be desirable to minimize the torque imparted to the system by the filament drive in order to prevent twisting or other deformation that could affect print quality. This system may employ multiple nozzles on the moving printhead. Each nozzle can have a lightweight drive mechanism associated with it and the active nozzle being driven can be switched. The head can have a "shifter" or indexing mechanism that allows the filament drive motor and flex shafts to be coupled to any of the nozzles. The print head can have a shift actuator bar, which causes a change in transmission coupling from one nozzle to any of the other nozzles when the shifter bar is moved to the position corresponding to the desired nozzle. The head can be moved outside of the active build area where there are shift stops that are rigidly connected to the structure. When the print head is driven in a direction so that the shift actuator bar is pushed to a new position relative to the print head, a change of actively driven nozzle is accomplished. Note that filament drive elements (e.g., drive gears) for nozzles which are not being actively driven can be in a locked configuration so that filament will not accidentally slip forward and unwanted extrusion from inactive nozzles is prevented.

In general, one or more aspects of the subject matter described in this specification can be embodied in one or more material deposition systems that include: an extruder for deposition materials, the extruder including two or more material entry ports, a mixing chamber, and an exit orifice; and a controller coupled with the extruder, the controller configured and arranged to dynamically change delivery rates of the deposition materials to be mixed in the mixing chamber before flowing from the exit orifice; wherein the controller combines a desired volume flow rate of material to flow from the exit orifice with a mix ratio to specify the delivery rates of the deposition materials. The deposition materials can be thermoplastic materials in filament form, the system can include filament drive systems configured and arranged to feed the thermoplastic materials in filament form into the entry ports, and the controller can be coupled with the filament drive systems and configured and arranged to dynamically change the mix ratio when operating the filament drive systems to control one or more properties of the material to flow from the exit orifice.

The controller can include a system controller and a ratio controller, the ratio controller being separate from and coupled with the system controller. The ratio controller can be configured and arranged to receive a first control input that commands the desired volume flow rate of material to flow from the exit orifice, a second control input that commands the mix ratio, and encoded information that species which of the filament drive systems to operate. Moreover, the filament drive systems can include stepper motors, the first control input can include a train of pulses, and the second control input can vary a speed of the stepper motors such that a sum of volume flow rates of filaments going into the entry ports equals the desired volume flow rate commanded by the first control input.

The extruder can include a mixing element that fills a substantial portion of the mixing chamber. At least 40% of the mixing chamber can be filled by the mixing element. The mixing element can extend from a first side of the mixing chamber to a second side of the mixing chamber. The mixing element can create a twisted path that is longer than a total length of the mixing chamber. For example, the mixing element can include a tapered helix.

The extruder can include two or more liquefication zones, each of the liquefication zones being associated with a respective one of the entry ports and each being configured and arranged to deliver a respective liquefied material to the mixing chamber, and wherein each of the liquefication zones has an entry cross sectional area and an exit cross sectional area, and the exit cross sectional area is less than the entry cross sectional area. Each of the liquefication zones can have at least one internal cross sectional area that is less than the entry cross sectional area and greater than the exit cross sectional area such that material travelling through the liquefication zone reduces in cross sectional area more than once as it travels from its entry port to the mixing chamber.

The extruder can include a thermally conductive element and a removable nozzle, the two or more liquefication zones can include cavities within the thermally conductive element, where the removable nozzle includes the exit orifice, and the mixing chamber can be formed by at least a first surface of the thermally conductive element and a second surface of the removable nozzle when the removable nozzle is mounted adjacent to the thermally conductive element. The exit cross sectional area of each liquefication zone adjacent to the mixing chamber can be less than 0.75 square millimeters, the mixing chamber can have a mixing volume that is less than 3 cubic millimeters, and an area of the exit orifice can be less than 0.75 square millimeters.

One or more additional aspects of the subject matter described in this specification can be embodied in one or more extruders for a three dimensional printer that deposits materials in liquid form, the extruder including: two or more entry ports for the materials of the three dimensional printer; a mixing chamber for liquefied materials of the three dimensional printer; a mixing element that fills a substantial portion of the mixing chamber; and an exit orifice through which the liquefied materials are delivered to an object being printed by the three dimensional printer. The mixing element can include a helix. Further, the extruder can include two or more liquefication zones, a thermally conductive element and a removable nozzle.

One or more additional aspects of the subject matter described in this specification can be embodied in one or more additive manufacturing systems that include: a build platform; and an extruder for deposition materials to be applied to a three dimensional (3D) object to be 3D printed in the build platform; wherein the extruder includes at least two nozzles of different types, and a first of the at least two nozzles is configured and arranged to dispense multiple materials with a controllable ratio. The first of the at least two nozzles can have an exit orifice with a first exit area, a second of the at least two nozzles has an exit orifice with a second exit area, and the second exit area is different than the first exit area. In addition, a third of the at least two nozzles can have an exit orifice with a third exit area, and the third exit area can be different than both the second exit area and the first exit area, such that the second nozzle dispenses material in a finer size than the first nozzle, and the third nozzle dispenses material in a coarser size than the first nozzle.

The at least two nozzles can include a fourth nozzle, and the extruder can include a nozzle chassis to which the first nozzle, the second nozzle, the third nozzle and the fourth nozzle attach to move rigidly with each other. The deposition materials can be thermoplastic materials in filament form, and each of the first nozzle, the second nozzle and the third nozzle can have a respective independent heating element. The first nozzle can be a removable nozzle that mounts adjacent to its heating element to form a mixing chamber between its exit orifice and liquefication zones including cavities within its heating element, the mixing chamber can include a mixing element, and the system can include a controller coupled with the extruder, the controller configured and arranged to adjust flow rates of multiple input materials to the liquefication zones and the heating elements of the second and third nozzles, respectively.

One or more additional aspects of the subject matter described in this specification can be embodied in one or more additive manufacturing systems that include: a build platform; a nozzle chassis having at least one heating element to liquefy deposition materials in filament form and at least one nozzle to extrude the liquefied deposition materials to build a three dimensional (3D) object to be 3D printed in the build platform; a drive system configured and arranged to move the nozzle chassis with respect to the build platform in at least one dimension; and a feed system for the deposition materials in filament form, the feed system including a feed dog mounted to the nozzle chassis, a motor mounted remotely from the nozzle chassis, and a flexible element configured to transfer power from the remotely mounted motor to the feed dog such that the nozzle chassis moves and accelerates independently of the feed motor.

The flexible element can include a fluid-filled conduit. The flexible element can include a hydraulic line. The feed dog can include a filament drive shaft, a pinch roller, a spring configured and arranged to push the pinch roller against a filament and into the filament drive shaft, and at least one gear coupled with the filament drive shaft, and the flexible element can include a flexible drive shaft configured and arranged to actuate the at least one gear. In addition, the feed system can include seven feed systems, each of the seven feed systems for a respective one of seven different deposition material filaments.

One or more additional aspects of the subject matter described in this specification can be embodied in one or more material deposition systems that include: a dispensing nozzle assembly; two or more filament material feed systems coupled with the dispensing nozzle assemble; a mechanical power input; and a selector system configured and arranged to change which of the two or more filament material feed systems is coupled to the mechanical power input. The material deposition system can further include: a motor mounted remotely from the dispensing nozzle assembly; and a flexible drive shaft coupling the motor with the mechanical power input.

The two or more filament material feed systems can include at least three filament material feed systems for three different types of material filaments. The selector system can include a selector arm configured and arranged to index which of the two or more filament material feed systems is coupled to the mechanical power input in response to mechanical input. Indexing of the selector system can be controlled by a reverse motion of the mechanical power input. In addition, the two or more filament material feed systems can be reversible for a predetermined amount without causing indexing, but indexing can occur after a predefined value of reverse mechanical input.

One or more additional aspects of the subject matter described in this specification can be embodied in one or more material dispensing systems that include: a moving set of two or more nozzles; a material feed system; and a feed index system; wherein the material feed system includes a single feed motor and multiple material feed drives; wherein the material feed system is configured and arranged to feed a single material at a time; and wherein the feed index system is configured such that the single feed motor is switchably coupled to a single material feed drive at a time so that a single feed motor is used to be able to selectively feed any of a number of materials through the material dispensing system.

The material dispensing systems can include flexible material conduits; wherein the material feed system can be stationary while the two or more nozzles are movable; and the flexible material conduits can connect respective material feed drives to respective nozzles such that the stationary material feed system is able to controllably feed multiple materials to the moving nozzles. The feed index system can include a rotary cam. In addition, the two or more nozzles can include four or more nozzles, and the material feed system can include four or more material feed drives.

One or more additional aspects of the subject matter described in this specification can be embodied in one or more material dispensing controllers for controlling dispensing rates of multiple materials, the controller(s) including: at least one control signal input line; three or more control signal output lines; and circuitry coupled with the at least one control signal input line and with the three or more control signal output lines and configured to (i) receive on the at least one control signal input line control input comprising drive information for a nozzle, flow rate information for a composite material to exit the nozzle, and encoded information specifying which of multiple materials to dispense at what ratios, (ii) decode the encoded information, and (iii) communicate on each of the three or more control signal output lines a control signal that specifies an individual material flow rate in accordance with the decoded information and the flow rate information for composite material to exit the nozzle.

The drive information can include position and velocity information. The three or more control signal output lines can be seven output lines and the control signals communicated on the respective seven output lines can be generated by the circuitry such that a sum of concurrent feed rates communicated via the seven control signal output lines (including one or more zero feed rates) is equal to a desired feed rate or volume flow rate of the composite material to be dispensed, the composite material being composed of a combination of each respective material to be dispensed responsive to each respective control signal. The encoded information can include a mix ratio and identification of which of multiple filament drive systems to operate. The at least one control signal input line can include two control signal input lines of a multi-extruder controller that couples with a system controller, and the two control signal input lines can include extruder cable and a fan cable; wherein the drive information and the flow rate information are received via the extruder cable, and the encoded information is received via the fan cable. In addition, the circuitry can include a hardware processor and a non-volatile memory storing instructions that cause the hardware processor to create the control signals.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 1D shows a perspective view of a multi-material dispensing system according to some embodiments.

FIG. 1E shows a close-up view of a multi-material mixing and dispensing nozzle according to some embodiments.

FIG. 1F shows a cross section view of a multi-material dispensing system according to some embodiments.

FIG. 1G shows a close-up cross section view of a multi-material dispensing nozzle according to some embodiments.

FIGS. 1H and 1I show perspective and front views respectively of a mixing element according to some embodiments.

FIGS. 2B and 2C show front and side views of a multi-material mixing and dispensing nozzle with additional material nozzles according to some embodiments.

FIGS. 6C and 6D show front and top views respectively of a selectable multi-material drive system according to some embodiments.

FIG. 6E shows a top view of a rotary cam for a selectable multi-material drive system according to some embodiments.

Like reference numbers and designations in the various drawings indicate like elements.

DETAILED DESCRIPTION

Figure 1A:
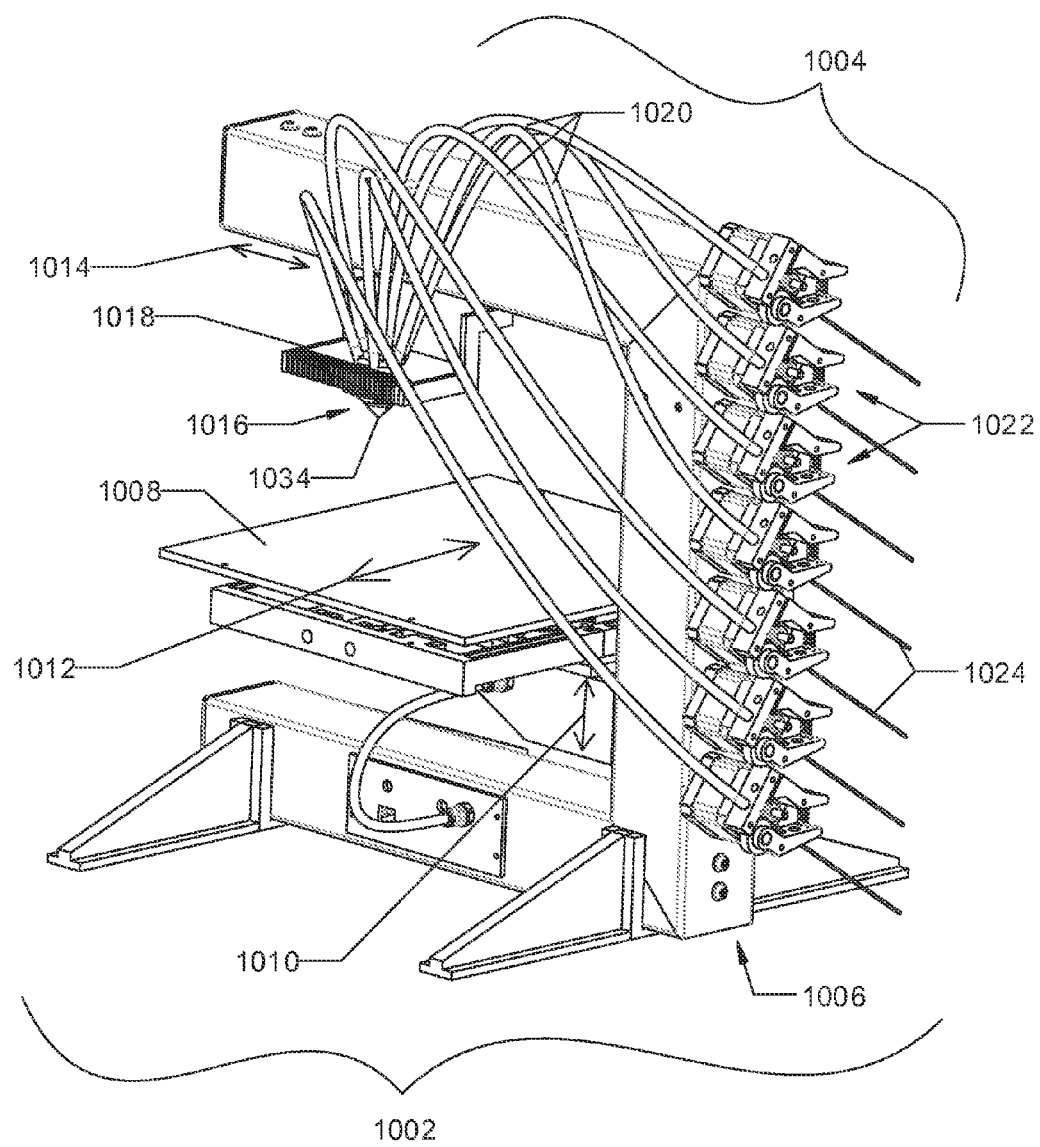
FIG. 1A illustrates a perspective view of an additive manufacturing system (a.k.a. 3D printer) with a multi-material dispensing system according to some embodiments.

FIG. 1A shows an overview of an additive manufacturing system 1002. System 1002 includes a multi-material dispensing system 1004. System 1002 also includes a frame 1006, a build platform 1008, a vertical motion (Z) drive system 1010, a lateral motion (Y) drive system 1012, and an orthogonal lateral motion (X) drive system 1014. There are many commercial additive manufacturing systems available that include many variations of the elements 1006, 1008, 1010, 1012 and 1014 and their functions are widely understood in the field. This invention focuses primarily on the details of material dispensing system 1004 and its enhancement of the capabilities of manufacturing system 1002.

Dispensing system 1004 includes a dispensing nozzle 1016, a nozzle chassis 1018, material conduits 1020, and material feed systems 1022. Additive manufacturing material in filament form (filaments) 1024 are shown entering feed systems 1022.

In the embodiment shown, build platform 1008 is movable relative to frame 1006 via Z drive 1010 and Y drive 1012 and nozzle 1016 is movable relative to frame 1006 via X drive 1014. Many other configurations are possible including systems in which the build platform is stationary and a nozzle moves in 2 or 3 drive axes. The material dispensing system embodiments of this invention such as 1004 are applicable to nearly any additive manufacturing system configuration that is able to use material feedstock fed through conduits.

Material dispensing system 1004 may use material in filament form such as 1024 which is conveyed to nozzle 1016 through conduits 1020 with any required feed forces and velocities created via feed systems 1022. Feed systems 1022 may feed multiple filaments 1024 (or materials in other form) at once at the same or differing feedrates. If multiple materials are fed at once, they are mixed inside nozzle 1016 to create an output material 1034 that is a mixture of the input materials such as filaments 1024, with the mix ratio controllably determined by the mass or volume feedrates of the filaments (or input materials if they are not in filament form). FIG. 1A shows seven (7) filaments 1024 and associated feed systems 1022. Seven conduits 1020 can be tightly packed into nozzle 1016, but other numbers of filaments or drive systems are also possible. Systems with 2, 3, 4, 5 or 6 materials and drive systems are equally feasible. Systems with more than 7 materials and drive systems are also feasible. In many systems, such as fused deposition modeling (FDM) machines, materials are deposited while the dispensing system nozzle and/or build platform are moved. Material may be deposited in shapes and layers as desired to construct a part in nearly any desired three dimensional shape. The ability to mix materials and/or colors in any combination or ratio greatly enhances the range of capabilities of such manufacturing systems.

The various materials such as filaments 1024 may be different colors of a similar base material which may be mixed together in any ratio. If the correct filament input colors are chosen (typically Cyan, Yellow, Magenta, White and Black), nearly any desired output material color can be created. Additionally, other appearance related effects can be created by including clear, metallic or pearlescent filaments as well. One filament may also be a "support material" that may be fed at selected times so that certain areas of the resulting part are composed of the support material which may be removed later. This allows the creation of parts with overhangs, hollow areas and thin structures in the primary material while maintaining good dimensional control during fabrication. Additionally, one or more filaments may be differing materials such as elastomers, harder materials, softer materials, conductive materials etc. The material dispensing system of this invention allows parts to be created in multiple materials and even variable ratio blends of different materials while requiring only a single nozzle.

Figure 1C:
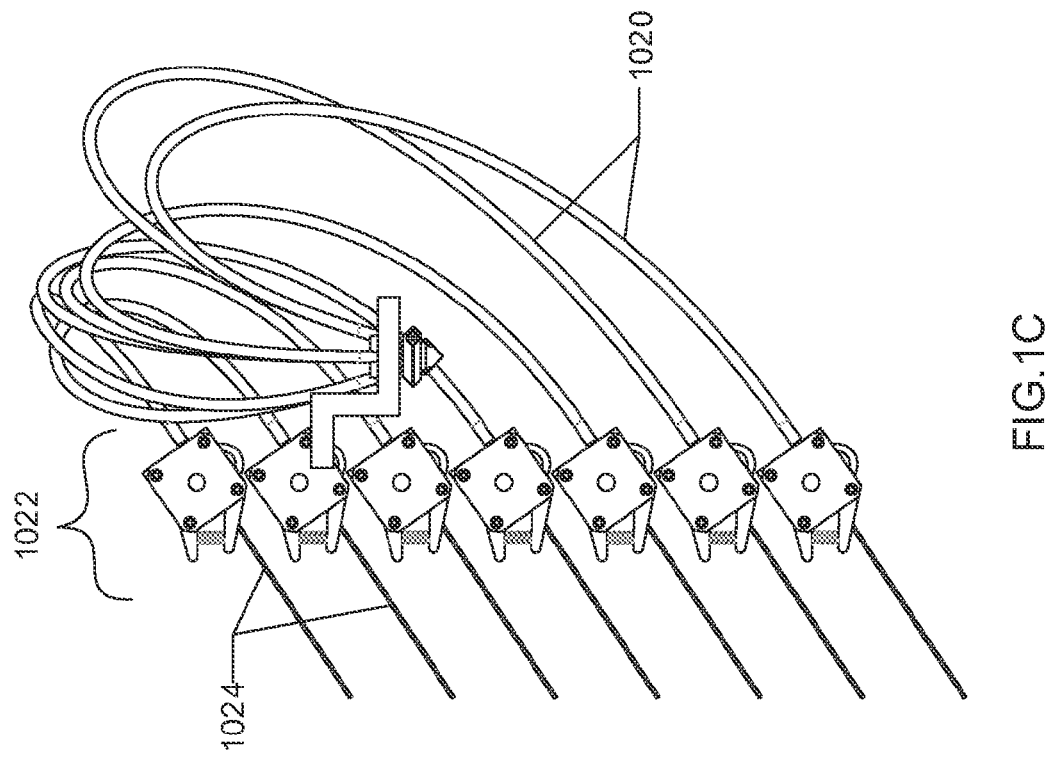
FIGS. 1B and 1C show front and side views respectively of a multi-material dispensing system according to some embodiments.
Figure 1B:
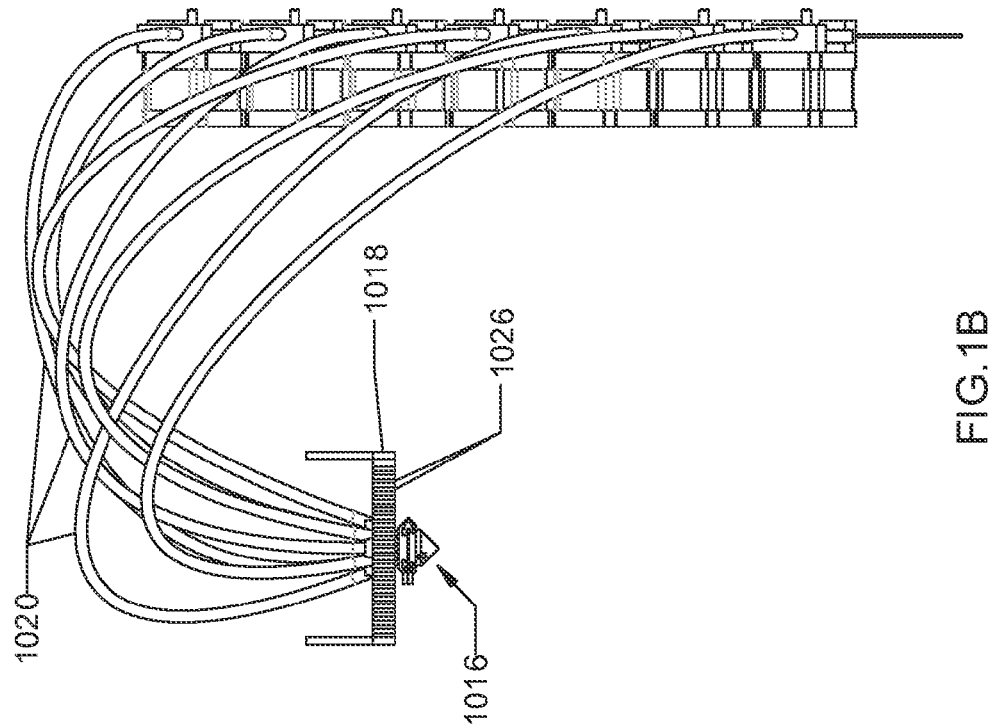

FIG. 1B shows a front view of material dispensing system 1004. Nozzle 1016 is mechanically connected to chassis 1018 and moves rigidly as chassis 1018 is moved. Chassis 1018 may include heatsink fins 1026. Material from filaments 1024 may be heated inside nozzle 1016 to change its viscosity and allow for mixing and extrusion. In some cases it is desirable to limit the extent of the heat affected zone in system 1004. Heatsink fins 1026 dissipate heat to the atmosphere and thereby lower the temperature of chassis 1018.

FIG. 1C shows a side view of material dispensing system 1004 where the path of filaments 1024 through conduits 1020 is shown more clearly. Feed systems 1022 are shown arranged vertically in a column, each having a respective filament 1024 and conduit 1020. Many other spatial arrangements of feed systems are possible. This is one of the benefits of using a flexible material for conduits 1020. Another benefit is that the forces required to accelerate the moving portion of material dispensing system 1004 are greatly reduced by limiting the mass of the moving portion—as opposed to other existing systems where the feed systems (typically including motors) are attached to and move with the nozzle. Systems currently exist that can dispense two materials from separate nozzles, and two feed systems with motors must be moved and accelerated with the print nozzles. This greatly limits the speed of printing and becomes impractical if extended to many colors or materials (i.e. more than two).

FIG. 1D shows a different perspective view of dispensing system 1004. In this view details of feed systems 1022 are visible. Feed systems 1022 may include motors 1032, drive elements 1034, and idler wheels 1036. The feed system arrangement shown here is simple and effectively converts torque generated by motors 1032 into driving force for filaments 1024, but many other arrangements are possible. FIG. 1D contains a detail circle indicating the area that is shown in FIG. 1E.

FIG. 1E shows a close-up view of the detail circle in FIG. 1D. Heatsink fins 1026 are more clearly visible on the nozzle chassis 1018. Nozzle 1016 may include a heater 1028. Nozzle 1016 also has an orifice 1030 out of which an output material 1034 is emitted or extruded. Output material 1034 may be a mixture of the input filaments 1024 according to their respective flowrates. An insulating volume 1038 between nozzle 1016 and chassis 1018 may be included to limit the flow of heat from the nozzle to the chassis. Volume 1038 may be filled with a solid insulating material such as aerogel or fiberglass or a gas such as air, or it may be a void or vacuum.

FIG. 1F shows a cross section view of material dispensing system 1004. Filaments 1024 pass out of conduits 1020 and into a heating body 1040 that is part of nozzle 1016. FIG. 1G shows an enlarged view of the area of nozzle 1016 in the detail circle in FIG. 1F. Material from filaments 1024 flows through passages 1048 which may neck down as shown in FIG. 1G. A mixing volume 1042 is created between heating body 1040 and a nozzle cap 1044. Nozzle cap 1044 includes orifice 1030 and may be removable for cleaning Having chambers 1048 neck down before reaching mixing volume 1042 allows the materials to stay separate as long as possible and helps to reduce the required size of mixing volume 1042 which is advantageous. To enhance mixing, a mixer element 1046 may be included inside volume 1042. Mixer 1046 creates a circuitous path that material must flow through before exiting orifice 1030. Multiple semi-liquid materials flowing through the same circuitous path will tend to mix much better than if they had a short, straight path. Mixer element 1046 also fills a substantial portion of mixing volume 1042, thereby reducing the volume of latent, semi-mixed material that would have to be purged or expended before any material mix ratio change could be affected. Mixing volume 1042 and mixer 1046 can be designed to minimize the mass of material in the mix chamber while still achieving mixing sufficient for the desired homogeneity of the output material 1034.

FIG. 1H shows a perspective view of mixing element 1046. Mixing element 1046 may be formed from wire, sheet metal or some other material or process. This design has the advantage that wire forming or sheetmetal forming allow parts with the variable/muti-spiral shape to be made at very low cost. The form of mixing element 1046 curls in at the top to occlude the path of the center filament material as well as the outer filament materials, so that all must follow a similarly circuitous path and therefore mix together. FIG. 1I shows a front view of mixer element 1046 to show a different view of the spiral shape and circuitous path it creates.

The system shown in this embodiment and FIGS. 1A-1E allows many materials and/or colors to be dispensed and/or mixed by a single nozzle with very low mass and therefore very high accelerations and print speeds. It also enables on-the-fly changing of materials, colors and mix ratios with little or no purging and significantly increases the capabilities of FDM and other material deposition systems.

Figure 2A:
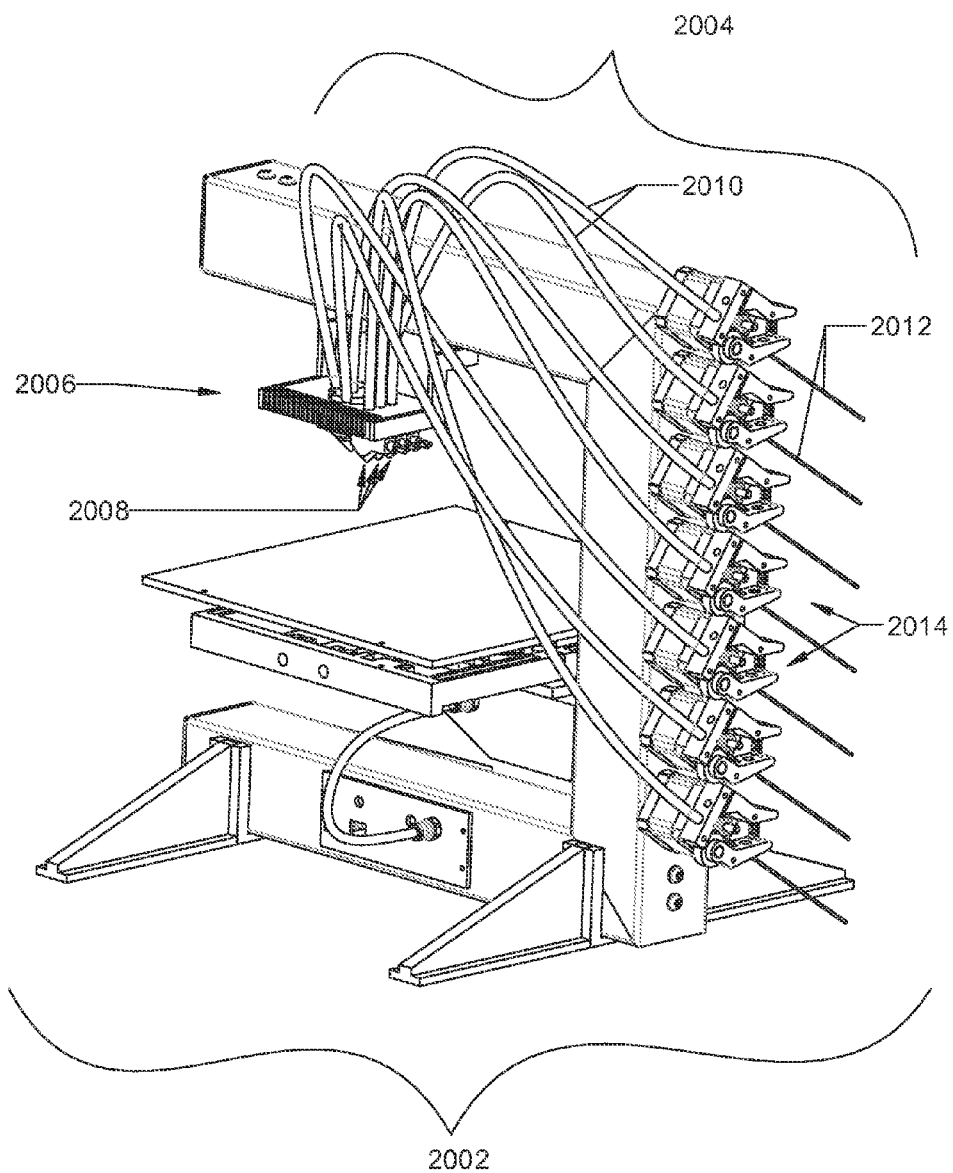
FIG. 2A illustrates a perspective view of an additive manufacturing system (a.k.a. 3D printer) with a multi-material mixing and dispensing nozzle with additional material nozzles according to some embodiments.

FIGS. 2A-2E show a different embodiment of a multi-material dispensing system. FIG. 2A shows an overview of an additive manufacturing system 2002. System 2002 includes a multi-material dispensing system 2004. Dispensing system 2004 is similar to the system in FIGS. 1A-1H and includes all the same elements including a mixer nozzle system 2006, but also includes additional independent nozzle systems 2008. The subcomponents that are the same as those of FIG. 1A-1H are not generally labeled or discussed again here as they were covered above. One notable difference is that mixer nozzle system 2006 is shown having only four (4) conduits 2010 and associated filaments 2012 and drive systems 2014. The other three (3) sets of conduits 2010 and associated filaments 2012 and drive systems 2014 feed respective independent nozzle systems 2008.

Figure 2D:
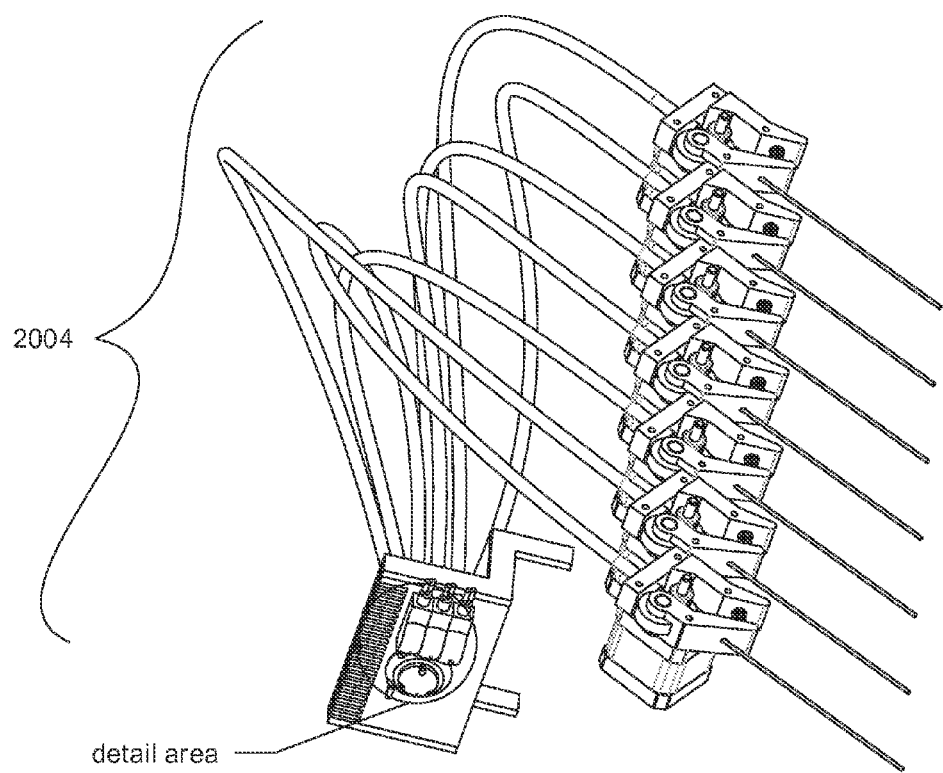
FIG. 2D shows a perspective view of a multi-material mixing and dispensing nozzle with additional material nozzles according to some embodiments.
Figure 2E:
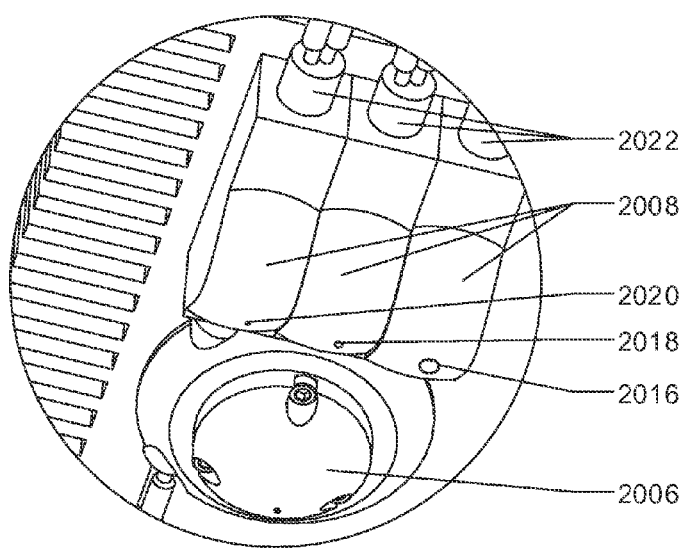
FIG. 2E shows a close-up view of multi-material mixing and dispensing nozzle with additional material nozzles according to some embodiments.

FIG. 2B shows a front view of dispensing system 2004 and more clearly shows the additional dispensing nozzles 2008. FIG. 2C shows a side view of dispensing system 2004 so that additional nozzles 2008 can be seen from the side. FIG. 2D shows a perspective view of system 2004 from below and includes a detail circle enclosing an area enlarged in FIG. 2E. In the enlarged view of FIG. 2E, additional nozzles 2008 are more clearly visible. Each nozzle 2008 has an associated exit orifice, 2016, 2018 and 2020. Orifice 2016 is a large orifice, orifice 2018 is a medium diameter orifice, and orifice 2020 is a small diameter orifice. The sizes of orifices 2016, 2018 and 2020 may be the same or different. This figure shows different orifice sizes which allow materials to be dispensed or deposited in different sizes and/or different rates in addition to the multi-material, muti-color and mix ratio possibilities provided by mixer nozzle system 2006. An additional nozzle 2008 with large orifice such as 2016 can be useful for filling large areas/volumes quickly or building parts that can be made with coarse resolution. An additional nozzle 2008 with small diameter orifice such as 2020 can be useful for creating fine details. An additional nozzle 2008 with medium or nominal diameter orifice such as 2018 can be useful for dispensing a different material than is dispensed by mixer nozzle system 2006 when it is desirable to prevent the possibility of mixing of that material with other materials. This can be useful for certain types of soluble support material for example. In addition, each additional nozzle 2008 can have its own respective independent heating element 2022.

Figure 3A:
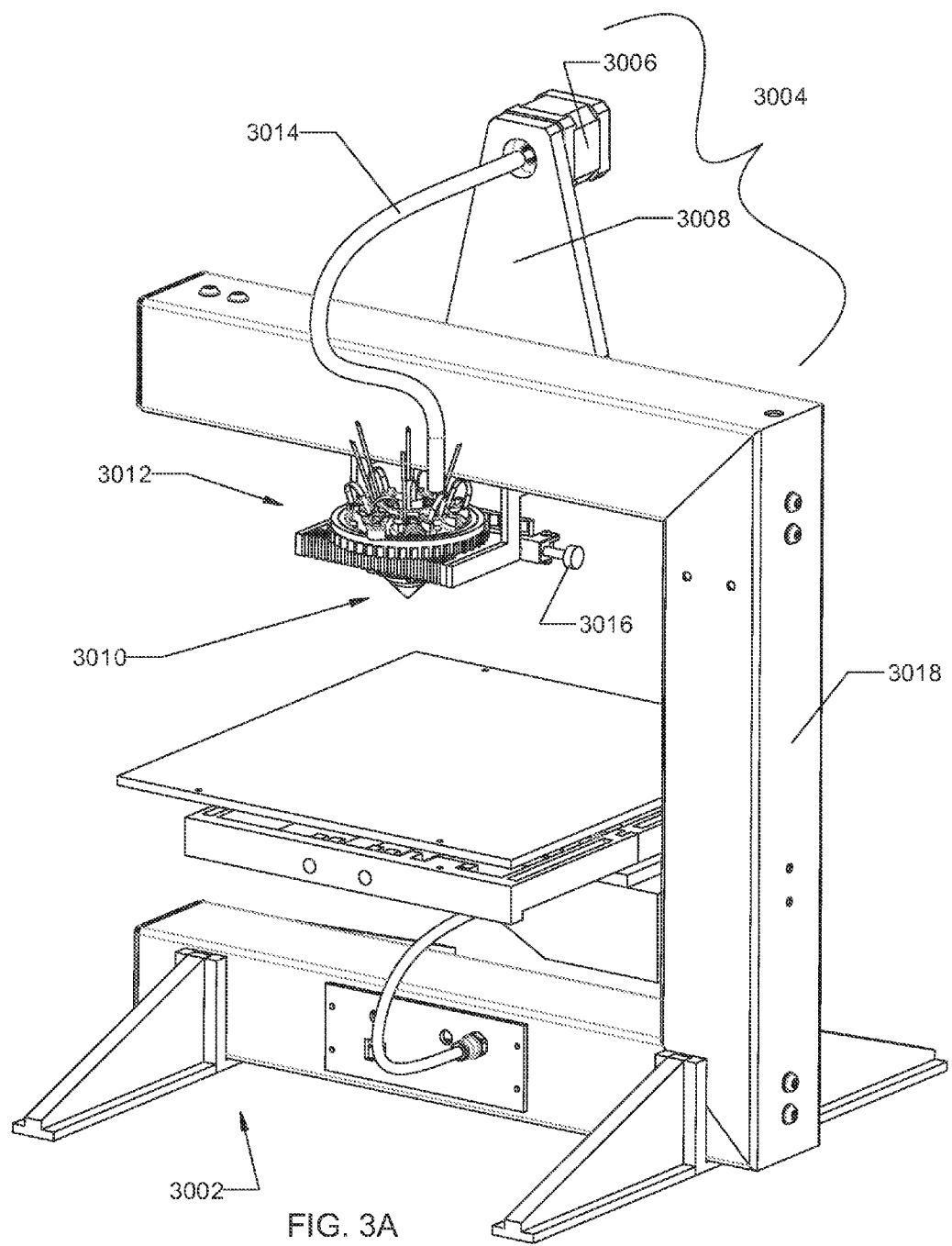
FIG. 3A shows a perspective view of an additive manufacturing system (a.k.a. 3D printer) with a multi-material dispensing nozzle according to some embodiments.

FIGS. 3A-3H show aspects of another embodiment of a material dispensing system. FIG. 3A shows an additive manufacturing system 3002 with a material dispensing system 3004. The dispensing system 3004 includes a single drive motor 3006 attached to manufacturing system 3002 via a motor mount 3008. A nozzle assembly 3010 includes a selectable multi-filament drive system 3012 which is powered by motor 3006 via flexible drive shaft 3014. A selector arm 3016 protrudes from multi-filament drive system 3012. System 3002 includes a frame 3018. When system 3002 moves nozzle assembly 3010 and drive system 3012 over to one side so that selector arm 3016 contacts frame 3018, arm 3016 is depressed and selects a different filament to be fed by drive system 3012. In this way, dispensing system 3004 can selectively dispense many different materials or colors through a single nozzle while only requiring a single material feed drive motor.

Figure 3B:
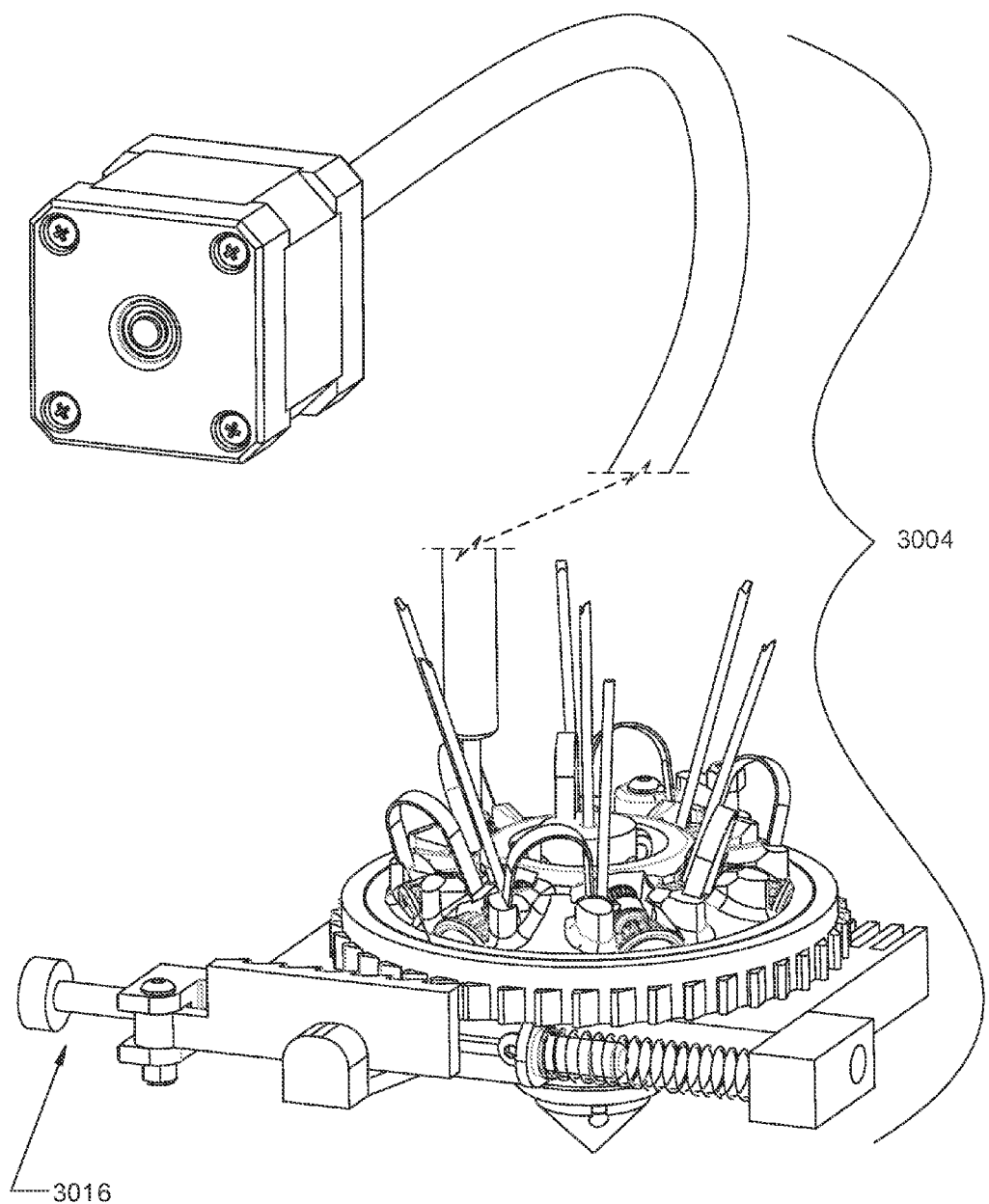
FIG. 3B shows a perspective view of a multi-material dispensing system according to some embodiments.
Figure 3C:
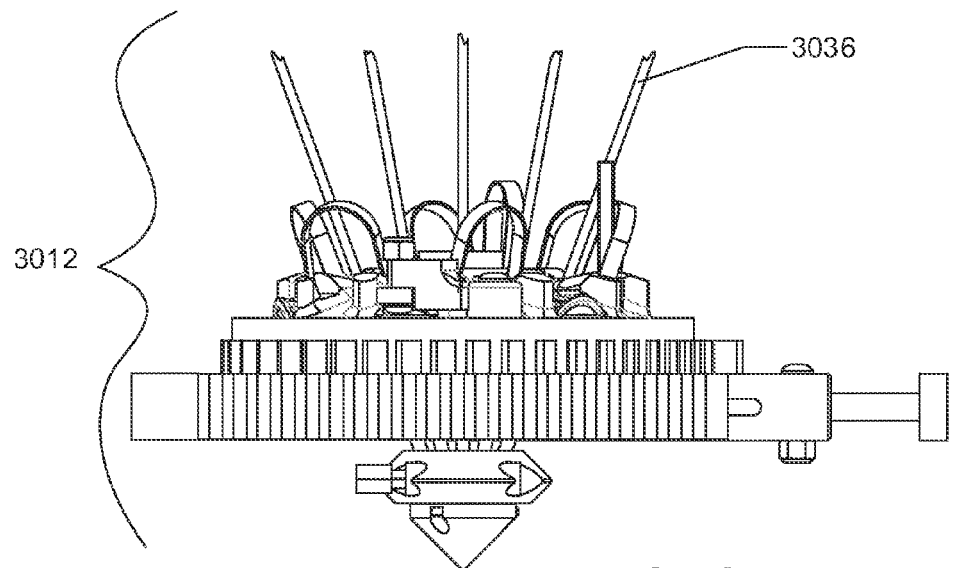
FIGS. 3C and 3D show front and top views respectively of a multi-material dispensing system according to some embodiments.

FIG. 3B shows a perspective view of material dispensing system 3004, showing more details of the mechanisms. FIG. 3C shows a front view of system 3012. The motor and flexible drive shaft are not shown for clarity. Material filaments 3036 are visible as they pass down into system 3012. Filaments are shown truncated at the top of the figure, but they are generally long lengths and fed from spools (not shown).

Figure 3D:
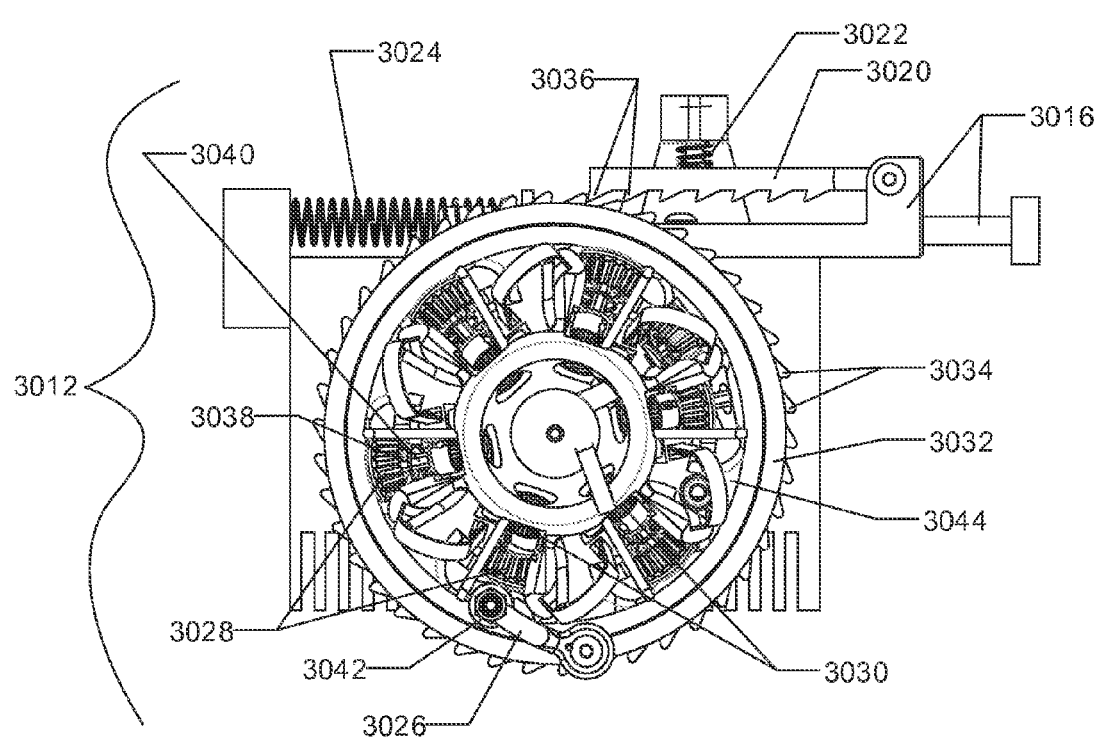

FIG. 3D shows a top view of system 3012. The motor and flexible drive shaft are not shown for clarity. A ratchet arm 3020 is rotatably attached to selector arm 3016. A spring 3022 pushes ratchet arm 3020 downward in FIG. 3D. A second spring 3024 maintains selector arm 3016 and ratchet arm 3020 in a nominal position which is to the right in FIG. 3D. A selector ring 3032 has teeth 3034 which mate with matching teeth 3036 on ratchet arm 3020. A cam arm 3026 is rotatably attached to selector ring 3032 and is spring loaded to press radially inward toward the center of selector ring 3032. A roller 3042 is rotatably mounted to cam arm 3026. Bevel gears 3028 are mounted on shafts 3040 and are able to slide along shafts 3040 within a certain range, but they are constrained to rotate with shafts 3040 (i.e. have no relative rotation motion) by via flats or keyways or the like (not clearly visible here). Gears 3028 are spring loaded radially outward by springs 3038. Filament drive elements 3030 are fixed to shafts 3040 so that they rotate when gears 3028 rotate. A housing 3044 holds the components of system 3044 together and has a cylindrical outer shape which constrains the rotation of selector ring 3032 (selector ring 3032 rotates about the outer cylindrical shape of housing 3044).

Figure 3E:
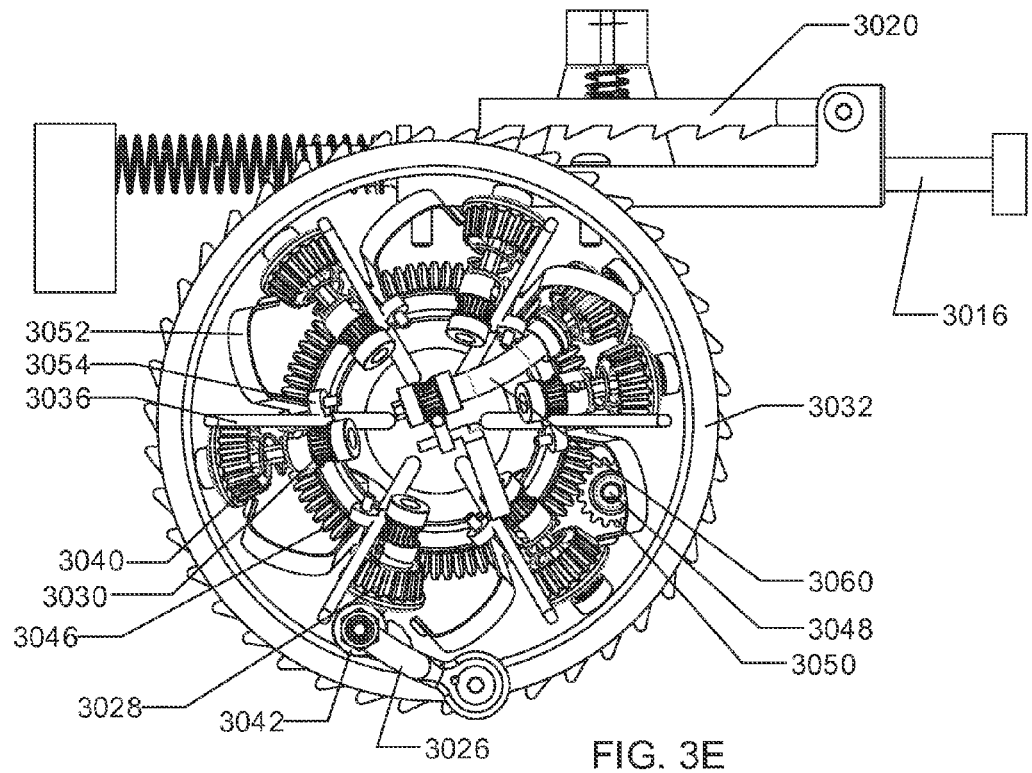
FIGS. 3E and 3F show top and perspective views respectively of a multi-material dispensing system according to some embodiments with some components removed to show inner components.

FIG. 3E shows a top view of system 3012 with housing 3044 removed to more clearly show internal components of system 3012. Filaments 3036 are pinched between filament drives 3030 and pinch rollers 3054. Pinch rollers are forced against filaments 3036 by pinch roller leaf springs 3052.

Figure 3F:
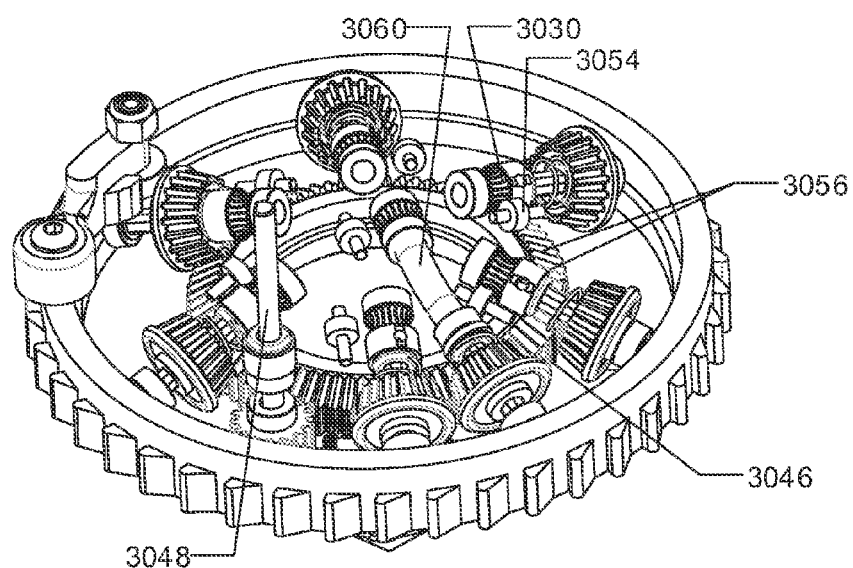

FIG. 3F is a perspective view of system 3012 with housing 3044 and pinch roller springs 3052 removed for clarity. A transfer gear 3046 is concentric with housing 3044 (not shown) and selector ring 3032. An input shaft 3048 couples motor 3006 (not shown here) and flex shaft 3014 (not shown here) to a drive gear 3050. Drive gear 3050 meshes with transfer gear 3046.

Basic Operation: Rotary motion and torque are transferred from motor 3006 to a selected one of filament drives 3030 via interactions of the transmission elements named above. When input shaft 3048 is turned by motor 3006 and flex shaft 3014, it turns drive gear 3050, which in turn causes transfer gear 3046 to turn. Any filament drive 3030 can be driven if its associated bevel gear 3028 is caused to be in mesh with transfer gear 3046.

Cam arm 3026 and roller 3042 always sits in a rotational position corresponding to one of the bevel gears 3028. The spring loading of cam arm 3026 is strong enough to overcome the relatively weaker spring loading of gear 3028 by one of springs 3040, so the particular gear 3028 that is being pushed by cam arm 3026 and roller 3042 moves radially inward and engages with a mating set of bevel teeth 3056 on transfer gear 3046. Other gears 3028 are all sprung outward and therefore not engaged with transfer gear 3046. Filament drives 3030 are coupled to respective bevel gears 3038, so that only one of filaments 3036 is driven at a time. Friction or stationary teeth (not shown) may hold the non-driven gears 3028 and filament drives 3030 stationary when they are not selected to be driven.

Changing which filament is selected to be driven: When selector arm 3016 is pushed laterally, it causes a ratchet arm 3020 to push and rotate selector ring 3032. When selector ring 3032 rotates, cam arm 3026 and roller 3042 move with it. Roller 3042 rolls off of the currently engaged bevel gear 3028, which then disengages from transfer gear 3046. Roller 3042 then rolls onto the next bevel gear 3028 causing it to be pushed radially inward and engage with transfer gear 3046, and therefore for its associated filament 3036 to be driven when motor 3006 rotates.

When force is removed from selector arm 3016, it is sprung back into its nominal position by spring 3024. Ratchet arm 3020 also moves back and ratchets over sloped teeth 3034 as it does so. The selection motion can be repeated indefinitely in the same direction and no reversing motion is required to get to select any particular filament.

Note that there are seven (7) filaments and associated drive components shown: six in a ring and a seventh in the center. The filament drive components associated with the center filament are slightly different due to the different geometry required to transfer torque to a filament drive in the center of the system. The principles of operation are the same except that there is a second, short flex shaft 3060 that couples the seventh bevel gear 3028 to the respective seventh filament drive 3030 for the center filament. The selection process is the same to select the center filament to be driven except that the selector arm 3016 is not pushed as far so that cam arm 3026 and roller 3042 move to the correct location. The system shown was designed so that selector arm can be pushed a fixed distance multiple times to get to select any filament. To get from one of the non-center filaments to the next non-center filament, the selector arm is pushed five times. To get from the preceding non-center filament to the center filament, the selector arm is pushed twice. To get from the center filament to the next non center filament, the selector arm is pushed three times.

Figure 3G:
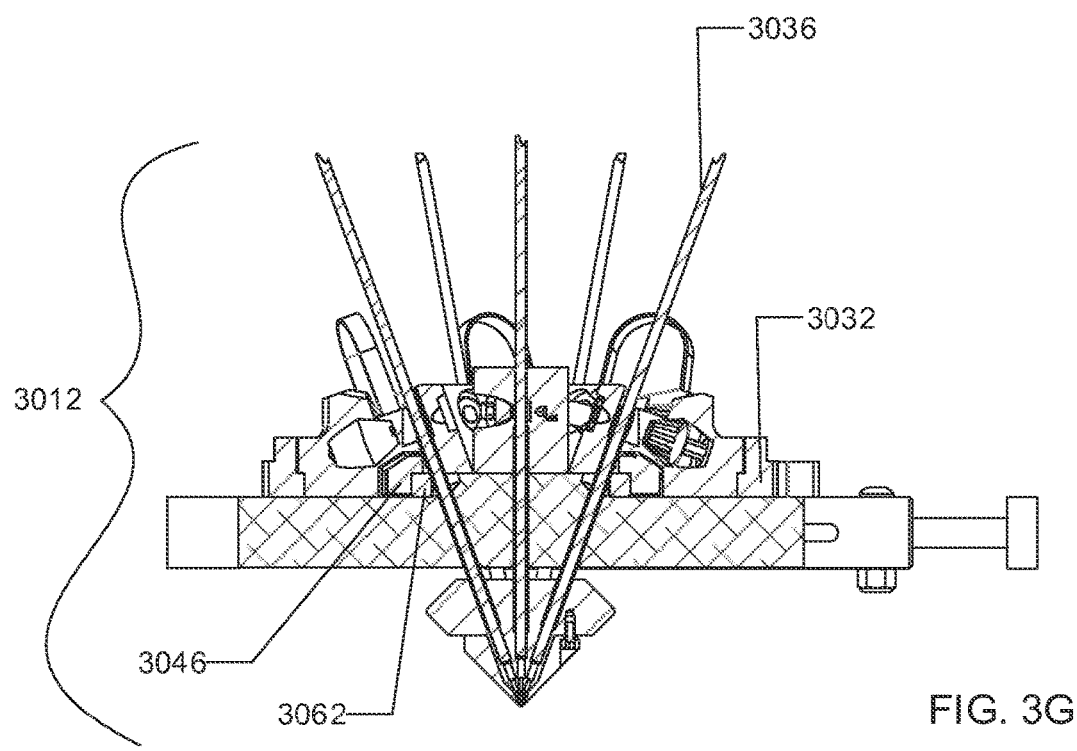
FIG. 3G shows a cross section view of a multi-material dispensing system according to some embodiments

FIG. 3G shows a cross section view of system 3012. Visible here are the details of how filaments 3036 move through the system and into the nozzle. Also visible in cross section are selector ring 3032, transfer gear 3046 and a bearing 3062 that transfer gear 3046 rotates on.

Figure 3H:
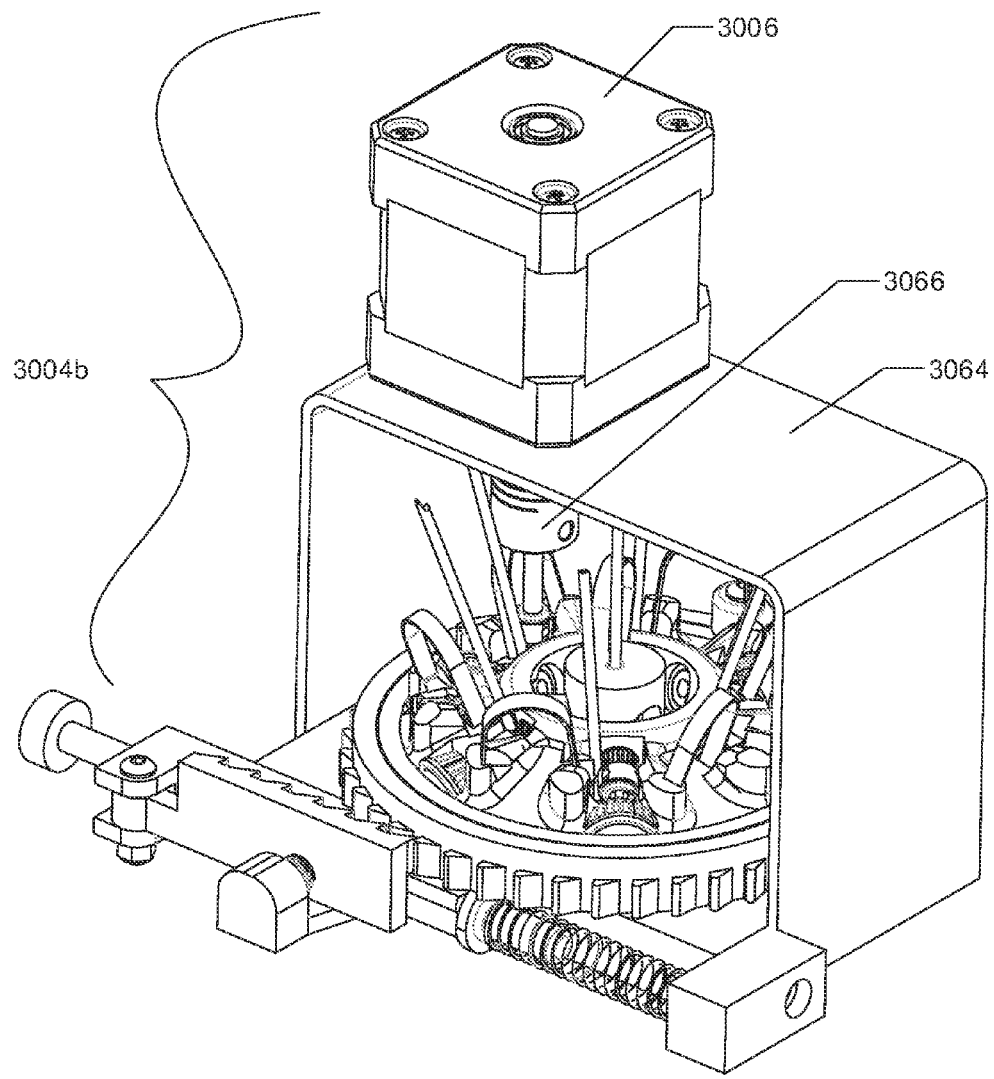
FIG. 3H shows a perspective view of a multi-material dispensing system according to some embodiments.

FIG. 3H shows a variation of system 3004, system 3004b in which motor 3006 is mounted directly to the selectable multi-filament drive system via a motor mount 3064 and moves with the nozzle (not shown) as it moves. A flexible coupling 3066 is visible which transfers torque from motor 3006 to the rest of the system. This variation which does not require a flex shaft may be desirable under some circumstances.

Figure 4A:
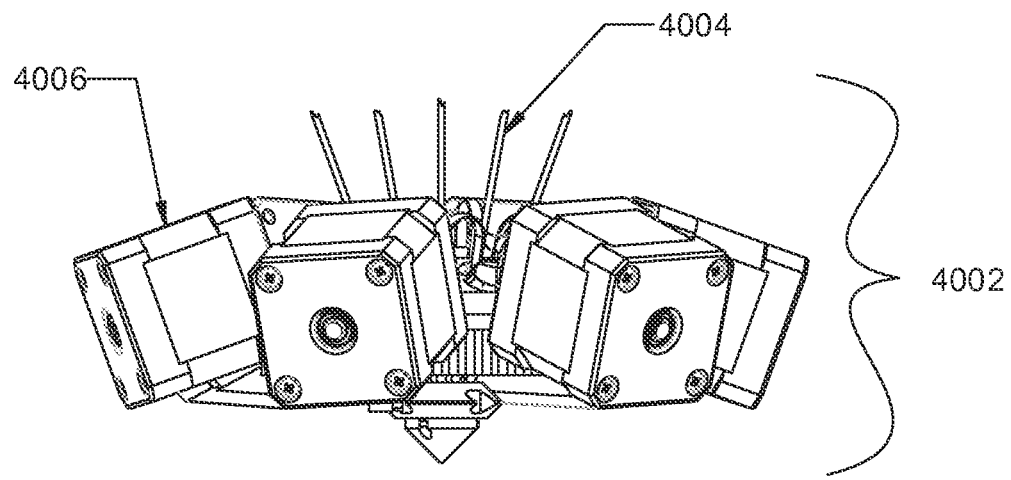
FIGS. 4A and 4B show front and top views respectively of a multi-material mixing and dispensing system according to some embodiments.
Figure 4B:
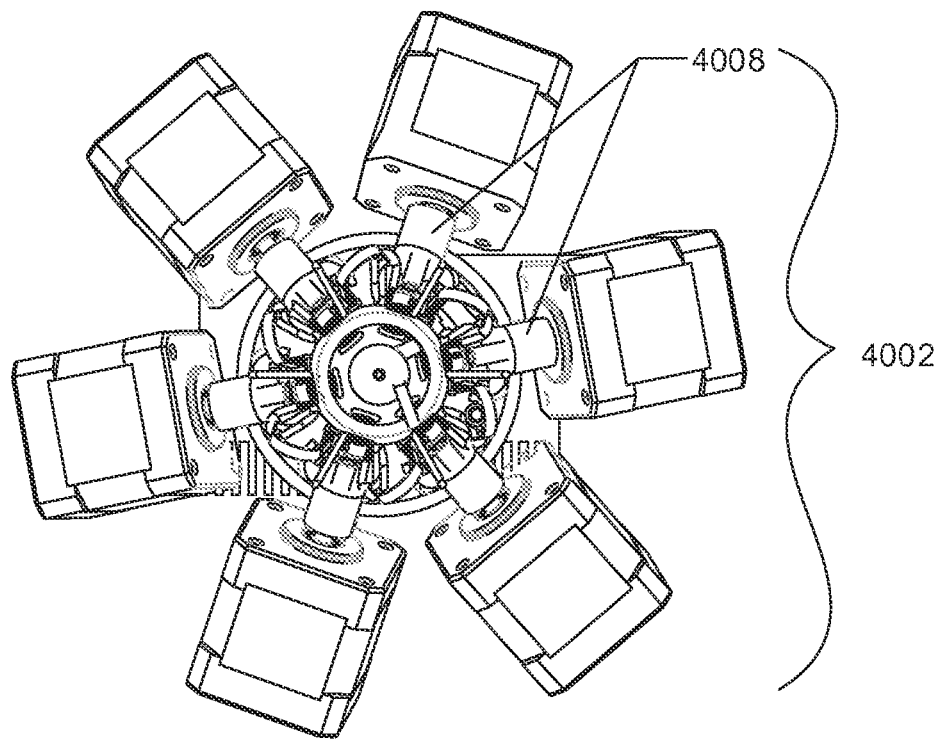

FIGS. 4A and 4B show another embodiment of a material dispensing system 4002. FIG. 4A is a front view. The filament drive components are similar to the system 3004 of FIGS. 3A-3G, but the selector-related components are omitted and each filament 4004 is driven by its own respective motor 4006. FIG. 4B is a top view of system 4002. Optional gear boxes 4008 are visible in FIG. 4B. Optional gearboxes 4008 may be used to reduce the gearing to allow the motors to turn faster relative to a given drive speed for the filament. While the added mass of the motors on the moving portion of system 4002 may not be helpful in many cases, it may be acceptable and useful in other specialized cases. System 4002 is able to drive more than one filament or material at a time and is therefore capable of mixing colors and materials similar to the system of FIGS. 1A-1E. The system 4002 is shown with six (6) filaments and associated drive components, but other numbers of filaments and drive systems are possible.

Figure 5A:
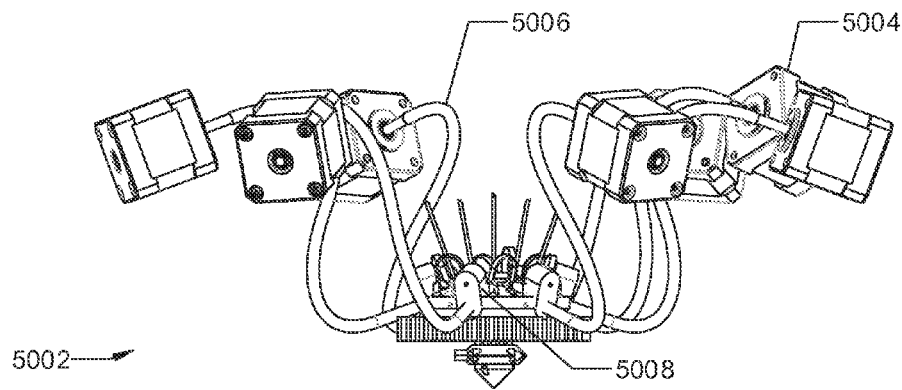
FIGS. 5A and 5B show front and top views respectively of a multi-material mixing and dispensing system according to some embodiments.
Figure 5B:
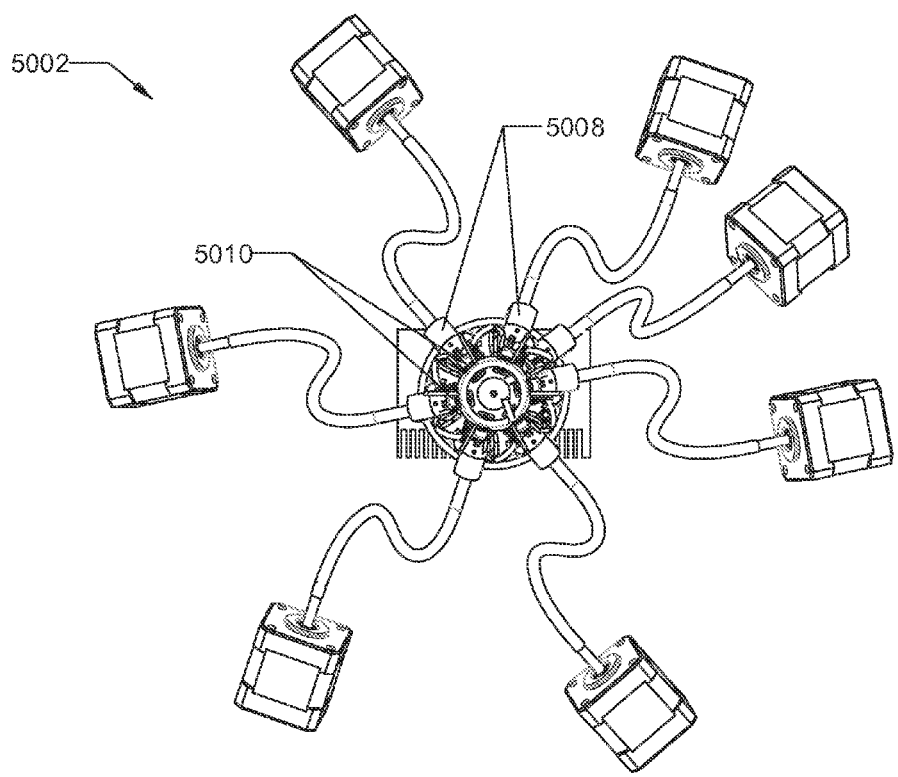
Figure 5C:
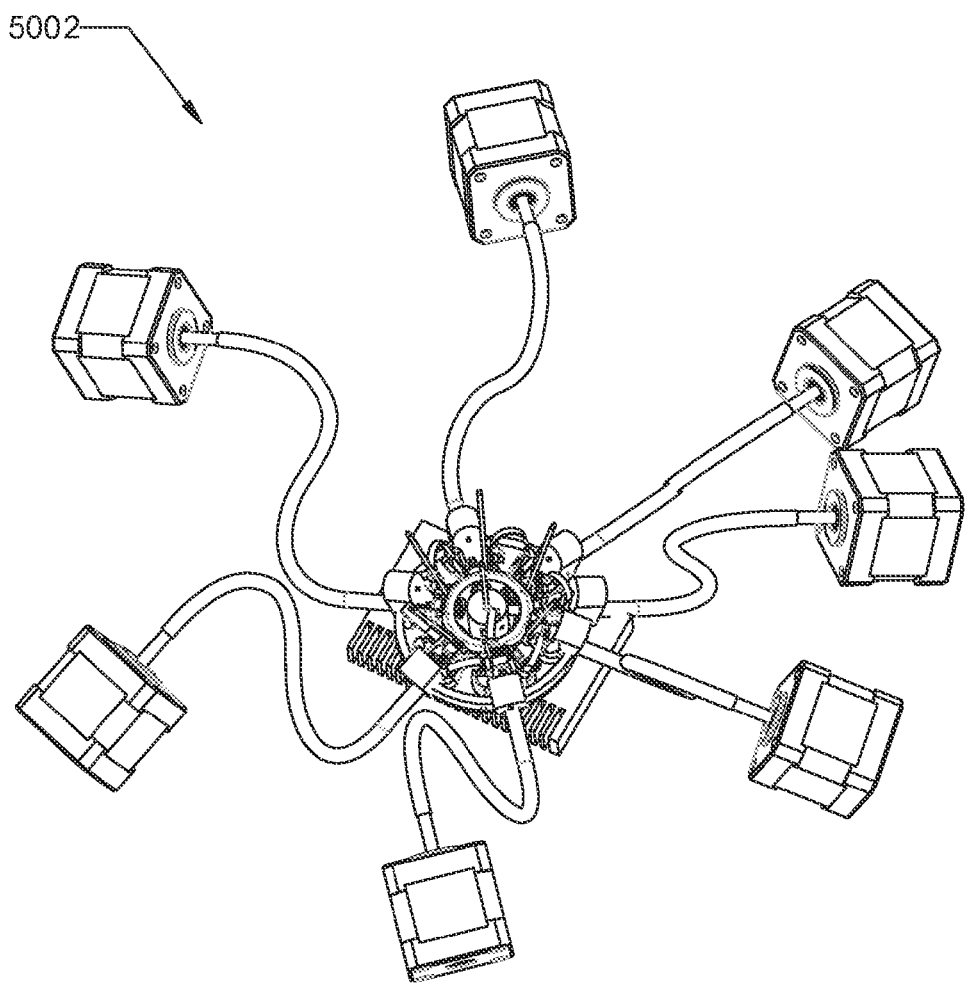
FIG. 5C shows a perspective view of a multi-material mixing and dispensing system according to some embodiments.

FIGS. 5A-5C show another embodiment of a material dispensing system 5002. FIG. 5A is a front view of system 5002. System 5002 is similar to system 4002 of FIGS. 4A and 4B, but motors 5004 are coupled to system 5002 with flexible drive shafts 5006. Motors 5004 can be attached to the frame of an additive manufacturing system (not shown). Optional gear reducers 5008 couple flexible shafts 5006 to filament drives 5010, visible in FIG. 5B which is a top view. FIG. 5C shows a perspective view of material dispensing system 5002. Motors 5004 would not need to move with the rest of system 5002, thereby greatly reducing the mass as compared to system 4002 of FIGS. 4A and 4B and enabling much greater acceleration and therefore reduced print job durations as well as less system deflection and higher print quality while still enabling selection and mixing of seven different colors or materials.

Figure 6A:
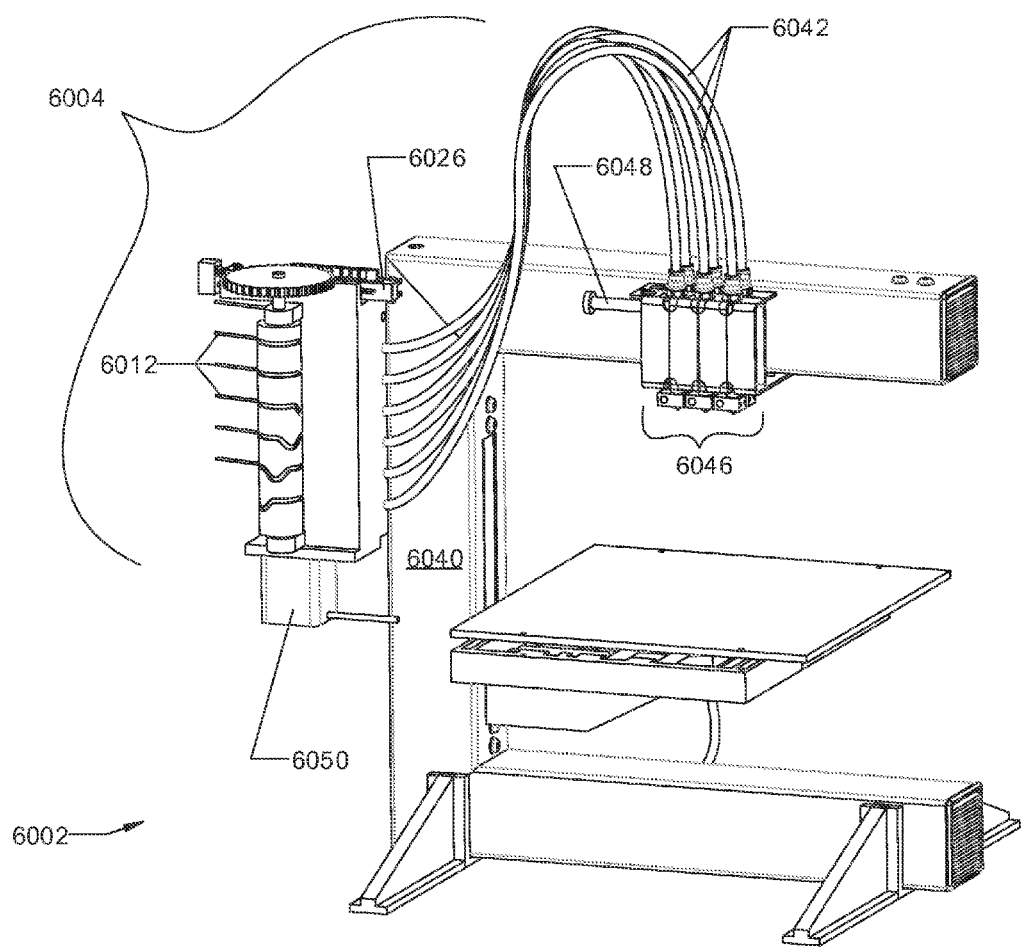
FIG. 6A shows a perspective view of an additive manufacturing system (a.k.a. 3D printer) incorporating a selectable multi-material drive system according to some embodiments.

FIGS. 6A-6H show another embodiment of a material dispensing system 6002. FIG. 6A shows a perspective view of an additive manufacturing system 6002 that incorporates a selectable material feed system 6004. This embodiment shows material in the form of filaments 6012 which are fed through conduits 6042 to independent dispensing nozzles 6046. System 6004 feeds a single selected one of filaments 6012 at a time, with torque and rotation input motion supplied by motor 6050. System 6004 is attached to a frame 6040 of manufacturing system 6002, while nozzles 6046 typically move relative to frame 6050. The selection of which filament to drive is accomplished as the system 6002 drives a pushrod 6048 up against a selector arm 6026. Selector arm 6026 moves other components described below to change which filament is being fed. Selector arm 6026 is only pushed in one direction and may be pushed any number of times to sequentially and cyclically index through all of filaments 6012. Six filaments and associated feed system components are shown, but in principle, any number of filaments may be used and selected to be driven by a single motor 6050.

Figure 6B:
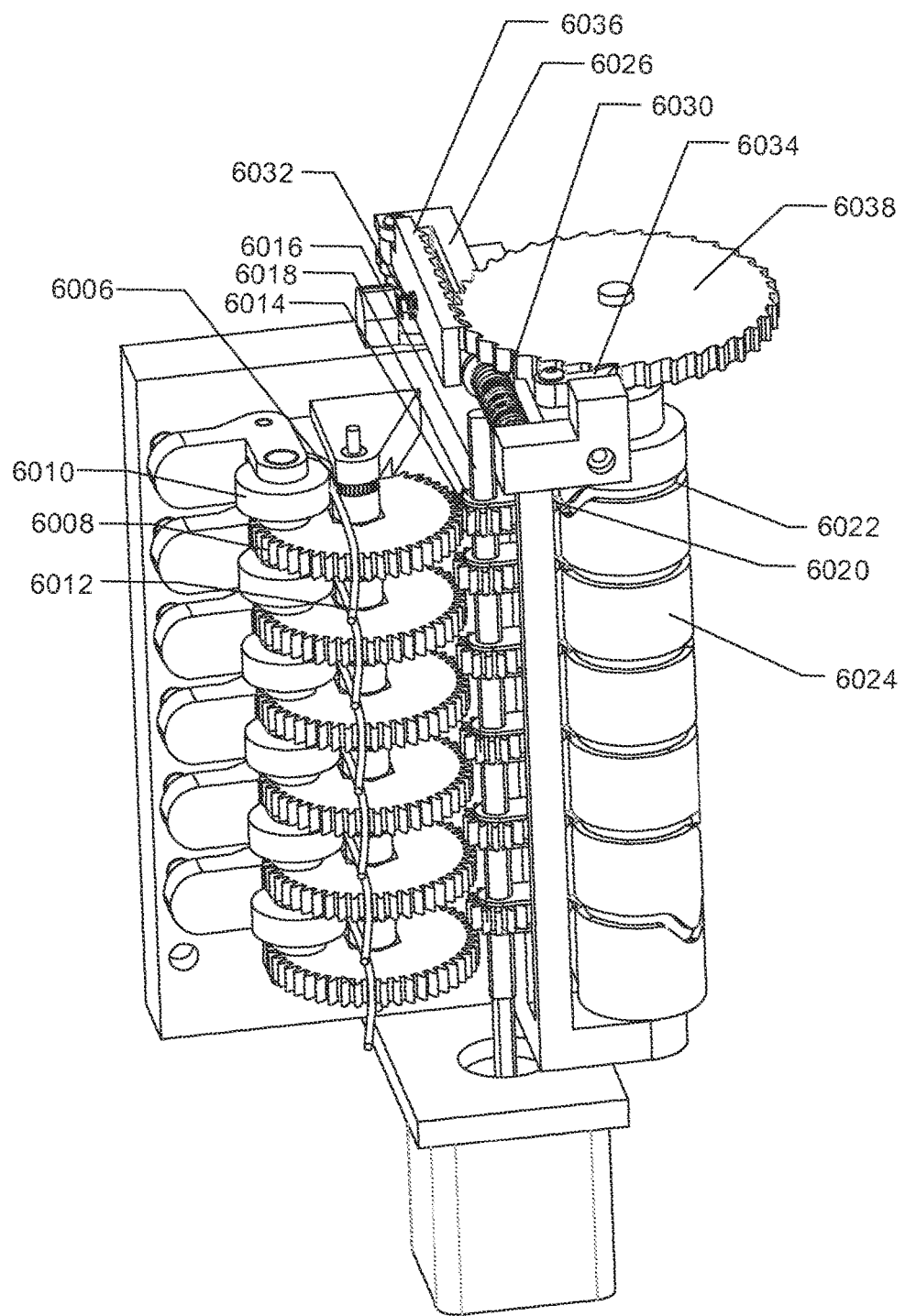
FIG. 6B shows a perspective view of a selectable multi-material drive system according to some embodiments.

FIG. 6B shows a perspective view of selectable material feed system 6004. Conduits 6042 and nozzles 6046 are not shown in this figure for clarity. Feed rollers 6006 are each coupled to respective driven gears 6008. Pinch rollers 6010 press filaments 6012 against feed rollers 6006. A set of drive gears 6014 are each rotatably coupled to a drive shaft 6016, but are able to slide axially on shaft 6016. Yokes 6018 surround each drive gear. Yokes 6018 have respective pins 6020 which ride in a set of slots 6022 on a rotary cam 6024. Cam 6024 is coupled to a ratchet wheel 6038. Selector arm 6026 is slidably mounted to a chassis 6028. A ratchet arm 6036 is rotatably mounted to selector arm 6026 and sprung into ratchet wheel 6038 by a spring 6030. A second spring 6032 biases selector arm 6026 to a nominal position. A pawl 6034 engages ratchet wheel 6038 to allow motion in only one direction.

Operation: Only one of the six drive gears 6014 can be engaged with its respective driven gear 6008 at any given time, so only a single filament 6012 will be fed at any one time. Any filament 6012 can be selected to be fed by pushing on selector arm 6026 repetitively until the desired drive gear 6014 corresponding to the desired filament is engaged with its respective driven gear 6008. When selector arm 6026 is pushed—for example by one of the axes of an additive manufacturing system—it causes ratchet arm 6036 to push on and rotate ratchet wheel 6038. When selector arm 6026 is no longer pushed, it returns to its nominal position so it can be pushed again. When ratchet wheel 6038 is rotated, it in turn rotates cam 6024. Slots 6022 in cam 6024 contact and move pins 6020 and cause yokes 6018 to move laterally (parallel to the axis of drive shaft 6016). Yokes 6018 in turn move their respective drive gears 6014 into or out of engagement with the respective driven gears 6008. Chassis 6028 constrains yokes 6018 so that they can only move in the desired direction and do not move out of plane.

FIG. 6C shows a top view of system 6004, with conduits truncated and nozzles removed for clarity. Many components are more clearly visible in this figure including pawl 6034, filament 6012, ratchet arm 6036 and ratchet wheel 6038. Additional components shown in this figure and not previously discussed include a third spring 6052 which forces pawl 6034 into engagement with ratchet wheel 6038, a pinch roller arm 6054 which supports pinch roller 6010, and a fourth spring 6056 which forces pinch roller arm 6054 and therefore pinch roller 6010 into filament 6012.

FIG. 6D shows a side view of system 6004 with chassis 6028 removed for clarity. Drive rollers 6006 are more clearly visible. The action of yokes 6018 on drive gears 6014 is more apparent in this view including the action of cam 6024 on yokes 6018 which causes only a single drive gear 6014 to be in mesh at a time, and therefor only a single filament to be driven at a time. When not engaged with a respective drive gear 6014, driven gears 6008 may be held stationary by an optional stationary tooth or teeth on the side(s) of yokes 6018 (optional teeth not shown). These optional teeth may be used to prevent unwanted filament motion or retraction.

Figure 6F:
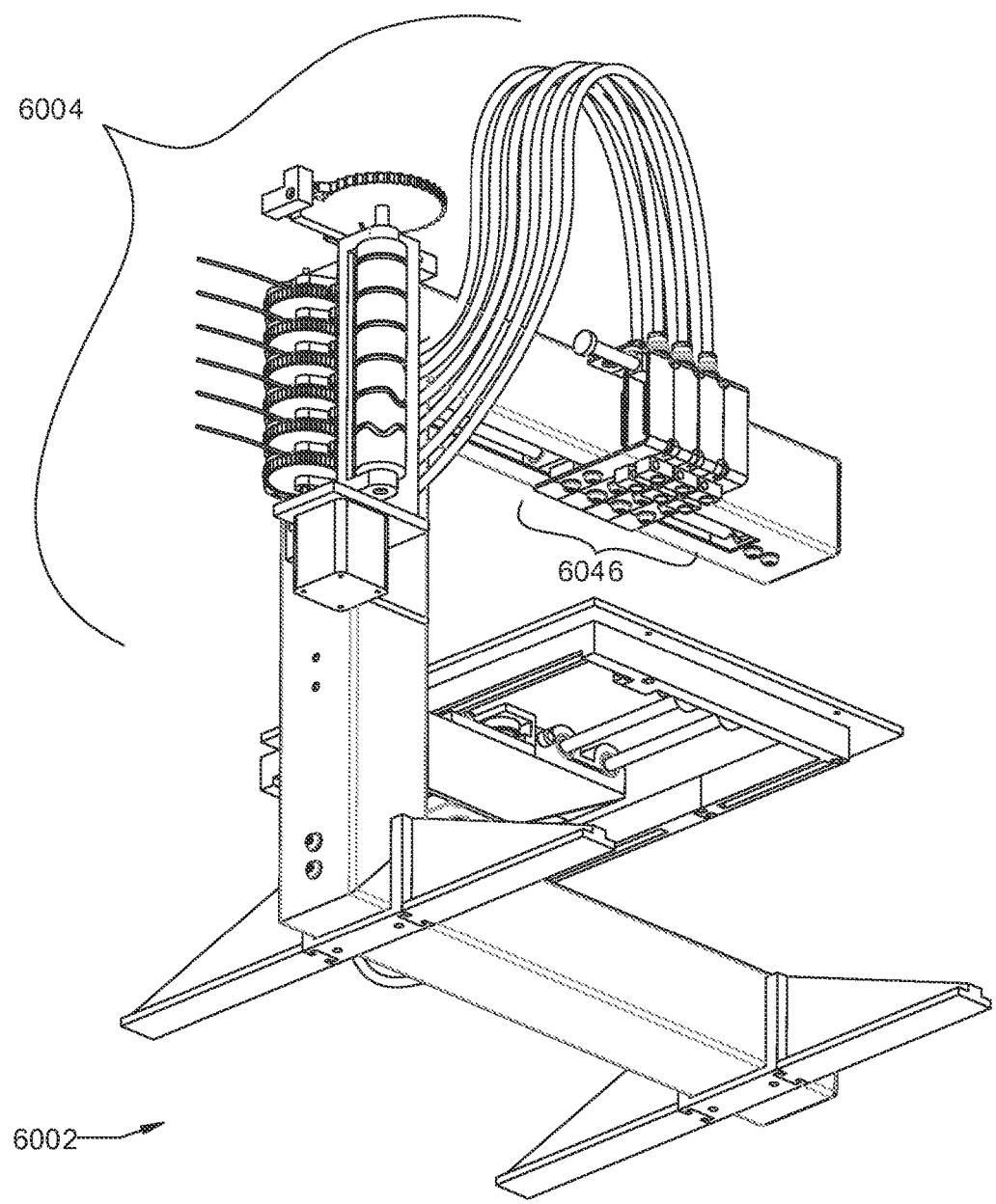
FIG. 6F shows a perspective view of an additive manufacturing system (a.k.a. 3D printer) incorporating a selectable multi-material drive system according to some embodiments.
Figure 6G:
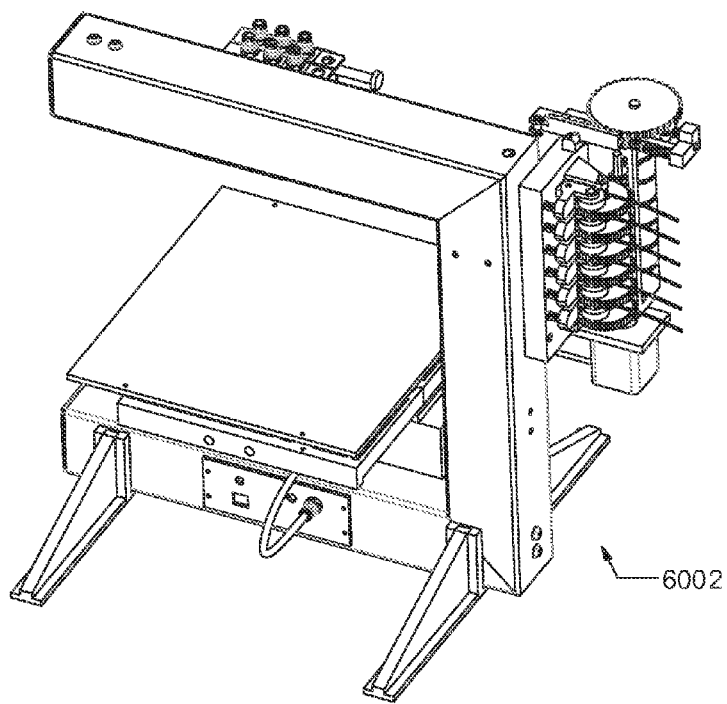
FIG. 6G shows a perspective view of an additive manufacturing system (a.k.a. 3D printer) incorporating a selectable multi-material drive system according to some embodiments with some components removed for clarity.
Figure 6H:
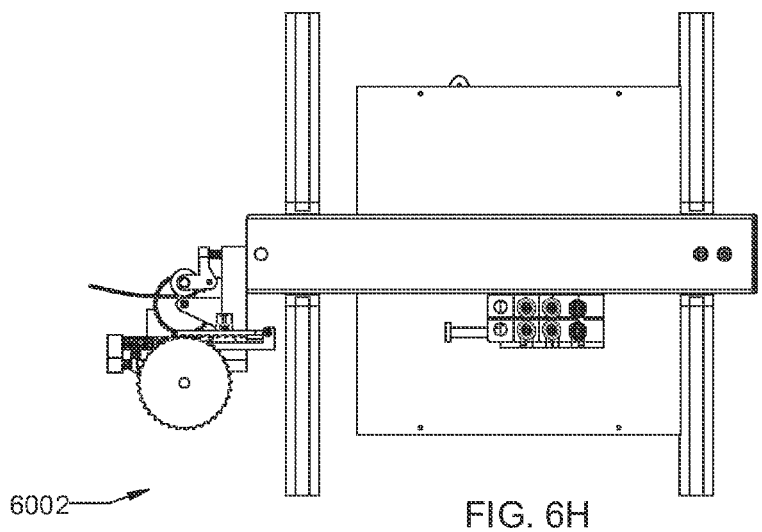
FIG. 6H shows a top view of an additive manufacturing system (a.k.a. 3D printer) incorporating a selectable multi-material drive system according to some embodiments with some components removed for clarity.

FIG. 6E shows rotary cam 6024 with hidden edges as dashed lines so that the form and arrangement of slots 6022 is visible. FIG. 6F shows a different perspective view of system 6002 and system 6004 with nozzles 6046 more clearly visible. There is one nozzle 6046 corresponding to each filament 6012. Each of nozzles 6046 acts independently. Each nozzle 6046 may have a different diameter and may emit a different material or color. FIG. 6G shows a different perspective view of system 6002 with conduits 6042 removed for clarity. FIG. 6H shows a top view of system 6002 with conduits 6042 removed for clarity.

The material feed system 6004 shown in FIGS. 6A-6H enables a simple, cost effective additive manufacturing system to dispense many types, sizes and colors of materials while requiring only a single material feed motor and not requiring any additional machine axes, motors or controls beyond the standard 3 axes plus single feed motor. A material feed system such as system 6004 can be readily retrofitted onto existing single-feed machines to dramatically increase their capabilities. Or it may be built into new systems to enable cost effective multi-material dispensing.

Figure 7A:
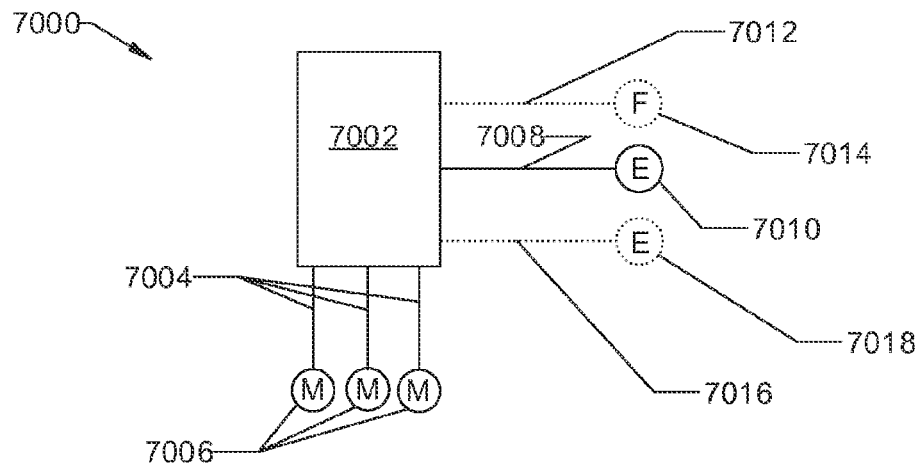
FIG. 7A shows a schematic of a prior art additive manufacturing system.

FIGS. 7A-7F show aspects of the control systems and intra-system communication for additive manufacturing systems. FIG. 7A shows a schematic of a typical prior art 3D printer system 7000. A system controller 7002 sends electrical control signals to three axis drive motors 7006 via axis drive cables 7004. A primary material extruder 7010 is controlled by controller 7002 via primary extruder cable 7008. An optional fan 7014 is controlled by controller 7002 via optional fan cable 7012. Additional optional fans are also possible but not shown. An optional secondary extruder 7018 is controlled by controller 7002 via optional secondary extruder cable 7016. Extruder cables are typically wires, and are often sets of four wires for controlling extruder stepper motors, but many other extruder drives and cable types are possible. Fans typically have a DC motor driven via two wire fan cables, but other types are possible.

As mentioned in discussion of previous figures, the capabilities of 3D printers can be significantly expanded with the addition of more materials, colors, and/or nozzles and nozzle sizes. There are many systems already in use with a controller and configuration similar to the schematic of FIG. 7A. These systems have controllers that do not have the capability to control extra extruder motors—they are limited to one or two extruders.

Figure 7B:
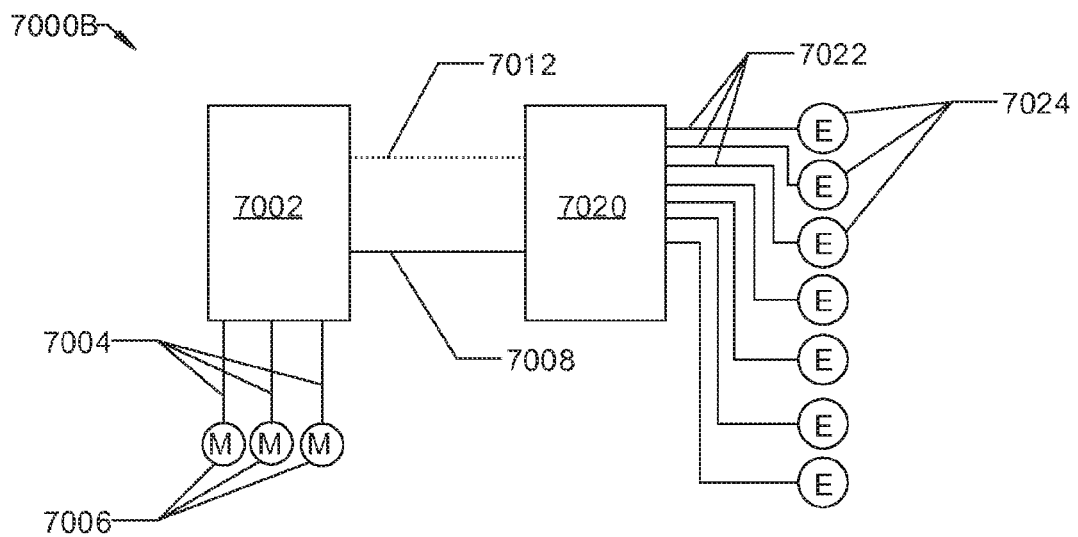
FIG. 7B shows a schematic of an improved additive manufacturing system according to some embodiments.

FIG. 7B shows a schematic of a system 7000B which is a modified version of system 7000 of FIG. 7A. System 7000B has been modified by the addition of a single inexpensive add-on component which enables the modified system to control many extruder motors. System 7000B includes system controller 7002, axis drive motors 7006, and axis drive cables 7004 as in FIG. 7A. Extruder cable 7008 and optionally fan cable 7012 are connected to a multi-extruder controller 7020. Multi extruder controller 7020 is connected to extruder motors 7024 via extruder cables 7022. Seven extruder motors 7024 are shown, but nearly any number is possible. Multi-extruder controller 7020 receives signals via cables 7008 and optionally 7012 that in combination contain enough information to uniquely specify which of extruder motors 7024 are to be driven and in what ratio of speeds or drive amounts. There are many forms that the information may be delivered to multi-extrude controller 7020. Two possibilities are discussed here but others are also possible and workable as part of the invention described here. Extruder cable 7008 may deliver pulses as if it was driving a single extruder and cable 7012 may deliver a train of pulses, a frequency, a voltage or some other signal that may be decoded to specify which extruder motor(s) 7024 to drive and in what ratio. Cable 7012 may deliver an encoded number at periodic intervals that may be matched to a meaning for extruder motor(s) to drive and/or ratios with a predefined lookup table stored in multi-extruder controller 7020. Alternately, all required information may be delivered via extruder cable 7008 without the need for cable 7012. One way of doing this is for cable 7008 to carry information about which extruders to drive and ratios at brief or predefined periodic intervals and to carry information about instantaneous position, velocity or drive pulses at other times. Alternatively, a second extruder cable (not shown here) can be connected from controller 7002 to multi-extruder controller 7020 to carry the required information. There are many other ways that the required information about which extruder motors to drive at what speeds or ratios can be delivered from controller 7002 to multi-extruder controller 7020 which would all support the function of system 7000B.

In this way, an existing 3D printer or other additive manufacturing system with controller designed for only one or two extruders can be readily and inexpensively modified to add the capability to control any number of extruder motors and therefore attain the enhanced capability of being able to print or produce parts with any number of colors, materials, different extrusion sizes and/or mix ratios of materials or colors.

Figure 7C:
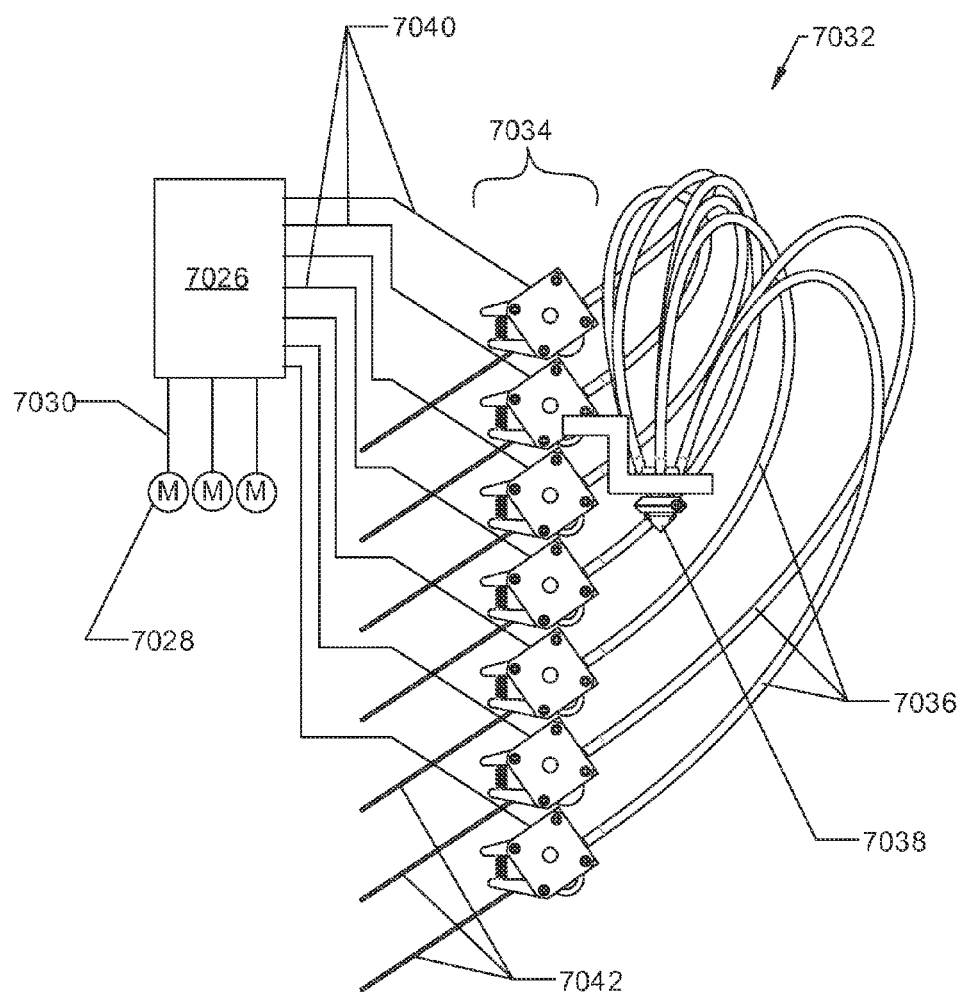
FIG. 7C shows an improved additive manufacturing system according to some embodiments.

FIG. 7C shows a schematic view of a system controller 7026 with integrated multi extruder drive capability. Controller 7026 is connected to and controls axis drive motors 7028 via axis drive cables 7030. A multi-filament, single nozzle material deposition system 7032 is shown which includes material feed motors 7034, material conduits 7036 and multi-material dispensing nozzle 7038. Controller 7026 is connected to and controls feed motors 7034 via feed cables 7040. Feed motors 7034 feed respective material filaments 7042 through conduits 7036 to multi-material dispensing nozzle 7038. Controller 7026 can meet the goals of controlling all the feed motors 7034 independently and therefore mixing colors and materials in any ratio through multi-material nozzle 7038. Most additive manufacturing systems and 3D printers in existence today have controllers that are not capable of controlling the seven feed motors 7034 shown, thus controller 7026 is an improved version with greater capability than those currently available.

Figure 7D:
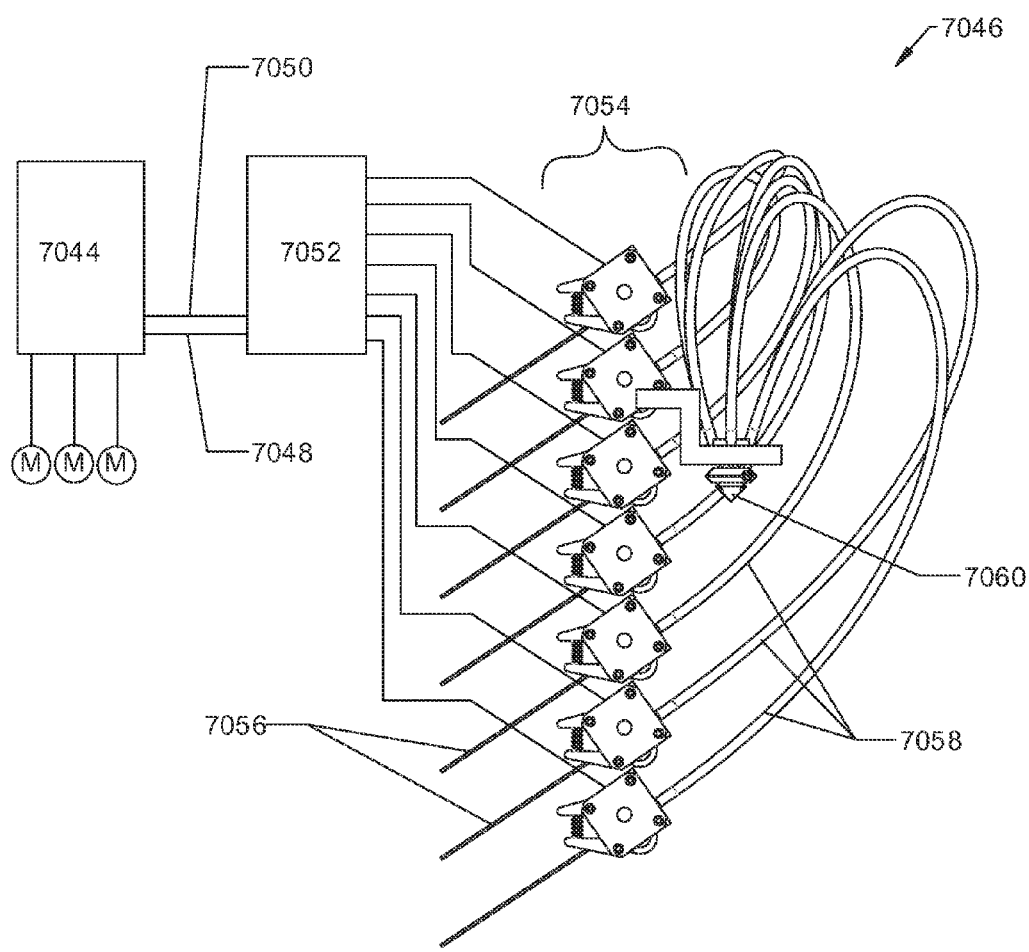
FIG. 7D shows an improved additive manufacturing system according to some embodiments.

FIG. 7D shows a schematic view of a simpler system controller 7044 and its connections to a multi-filament, single nozzle material deposition system 7046. Controller 7044 represents current typical 3D printer controllers that have only one or sometimes two feed motor cables 7048 and an optional fan cable 7050. Because of the limited outputs, controller 7044 is unable to control more than one or two feed motors if used normally. FIG. 7D shows the addition of an inexpensive multi-feed ratio controller 7052 which serves as an intermediary between controller 7044 and seven feed motors 7054. While seven feed motors 7054 are shown, in principle any number is feasible. Multi-feed ratio controller receives electrical signals via cable 7048 and optionally cable 7050. The signals received contain enough information to uniquely specify which feed motors 7054 are being driven and at what speeds, displacements or feed ratios. Zero, one or multiple feed motors 7054 may be driven at any given time to feed material filaments 7056 at the required rates through conduits 7058 to create a desired mixture of colors or materials in a multi-material mixing nozzle 7060.

Figure 7E:
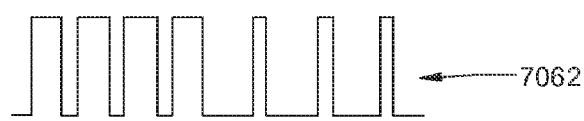
FIG. 7E shows communication signals related to an improved manufacturing system according to some embodiments.
Figure 7E:

FIG. 7E shows a schematic representation of possible signals transmitted by cables 7048 and 7050 of FIG. 7D. There are many ways to encode information about which feed motors to drive and at what speeds and ratios. FIG. 7E shows just one of many possible encoding patterns. Signal 7062 represents one possible electrical signal in that can be transmitted via cable 7048. Signal 7064 represents one possible electrical signal in that can be transmitted via cable 7050. Both signal 7062 and signal 7064 represent a varying voltages on the vertical axis plotted against time on the horizontal axis. Signal 7062 represents a number or code encoded in pulse-width-modulation (PWM). The times when the signal has a higher voltage may be referred to as "on" and the times when the signal has a lower voltage may be referred to as "off". The first four pulses shown in signal 7062 represent one number repeated four times. After the fourth pulse of Signal 7062, the ratio of the "on" and "off" pulse widths changes, and thus the number being communicated has changed.

The number being represented by the ratio of on and off pulse widths may be used to represent a particular feed motor to be driven, a combination of feed motors to be driven, a feed speed or displacement or a feed ratio. Information encoded in signal 7062 may also be decoded by comparing the number or code from the signal to a lookup table stored in controller 7052. Signal 7064 may also represent a number or code. Signal 7064 may be used to specify a particular feed motor to be driven, a combination of feed motors to be driven, a feed speed or displacement or a feed ratio. An alternate encoding and control scheme may similarly employ signals 7062 and 7064 to encode feed drive information, but in a different manner. One signal, for example signal 7064 may provide pulses which correspond to individual phase changes for a single stepper motor (i.e. each pulse may be used to command a single step of a given feed motor). The other signal (signal 7062) may provide pulses that are used to index or change or specify the motor being driven at a given instant. By rapidly indexing through the motors to be driven and sending each one of them individual pulses at the correct times, multiple motors may be driven using only these two signals via multiplexing in controller 7052. There are many other possible control schemes, signal variations, and encoding techniques which can be used.

Figure 7F:
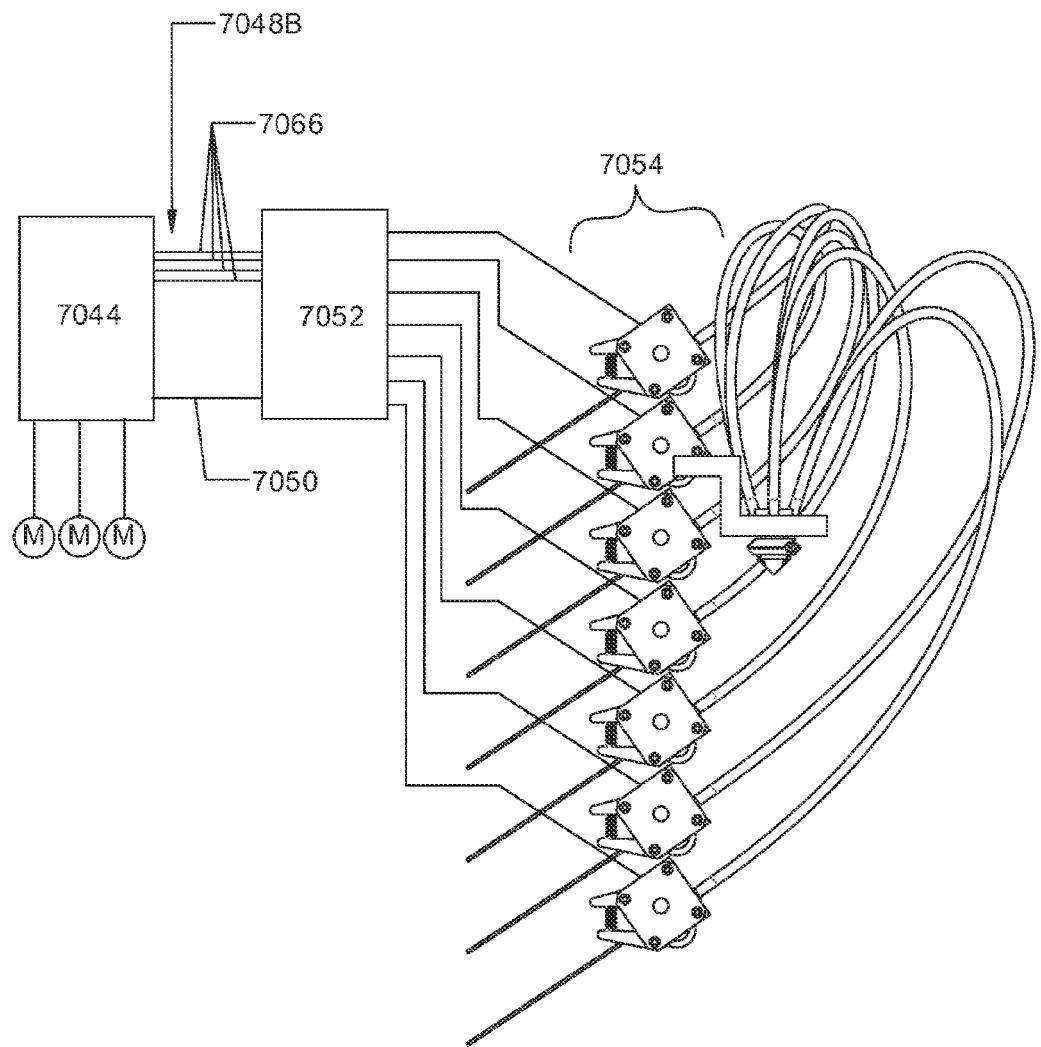
FIG. 7F shows an improved additive manufacturing system according to some embodiments.

FIG. 7F shows a different embodiment of the invention. The controller 7044 is connected to the inexpensive multi-feed ratio controller 7052, both previously described in FIG. 7D. Electrical signals are communicated from controller 7044 to multi-feed controller 7052 via cables 7048B and 7050. Feed motors 7054 are controlled by multi-feed controller 7052. In this embodiment, cable 7048B comprises sub-conductors 7066 each of which can communicate separate signals simultaneously. This multi-conductor cable 7044B is representative of typical stepper motor drive cables used to drive extruders in most current 3D printers. By communicating between controller 7044 and multi-feed controller 7052 with a greater number of signals, a greater resolution of mix ratios and/or a greater number of simultaneously driven feed motors can be enabled.

Embodiments of the subject matter described in this specification can be implemented in combination with digital electronic circuitry, or computer software, firmware, or hardware. Embodiments of the subject matter described in this specification can be implemented in an additive manufacturing system that uses one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A material deposition system comprising:
an extruder for deposition materials, the extruder comprising two or more material entry ports, a mixing chamber, and an exit orifice; and
a controller coupled with the extruder, the controller configured and arranged to dynamically change delivery rates of the deposition materials to be mixed in the mixing chamber before flowing from the exit orifice;
wherein the controller combines a desired volume flow rate of material to flow from the exit orifice with a mix ratio to specify the delivery rates of the deposition materials;
wherein the extruder comprises two or more liquefication zones, each of the liquefication zones being associated with a respective one of the entry ports and each being configured and arranged to deliver a respective liquefied material to the mixing chamber, and wherein each of the liquefication zones has an entry cross sectional area and an exit cross sectional area, and the exit cross sectional area is less than the entry cross sectional area; and
wherein each of the liquefication zones has at least one internal cross sectional area that is less than the entry cross sectional area and greater than the exit cross sectional area such that material travelling through the liquefication zone reduces in cross sectional area more than once as it travels from its entry port to the mixing chamber.

2. The material deposition system of claim 1, wherein the deposition materials are thermoplastic materials in filament form, the system comprises filament drive systems configured and arranged to feed the thermoplastic materials in filament form into the entry ports, and the controller is coupled with the filament drive systems and configured and arranged to dynamically change the mix ratio when operating the filament drive systems to control one or more properties of the material to flow from the exit orifice.

3. The material deposition system of claim 2, wherein the controller comprises a system controller and a ratio controller, the ratio controller being separate from and coupled with the system controller.

4. The material deposition system of claim 3, wherein the ratio controller is configured and arranged to receive a first control input that commands the desired volume flow rate of material to flow from the exit orifice, a second control input that commands the mix ratio, and encoded information that specifies which of the filament drive systems to operate.

5. The material deposition system of claim 4, wherein the filament drive systems comprise stepper motors, the first control input comprises a train of pulses, and the second control input varies a speed of the stepper motors such that a sum of volume flow rates of filaments going into the entry ports equals the desired volume flow rate commanded by the first control input.

6. The material deposition system of claim 2, wherein the extruder comprises a mixing element that fills at least 40% of the mixing chamber, wherein the mixing element comprises a tapered helix that extends from a first side of the mixing chamber to a second side of the mixing chamber and creates a twisted path that is longer than a total length of the mixing chamber.

7. The material deposition system of claim 6, wherein the extruder comprises a thermally conductive element and a removable nozzle, the two or more liquefication zones comprise cavities within the thermally conductive element, the removable nozzle includes the exit orifice, and the mixing chamber is formed by at least a first surface of the thermally conductive element and a second surface of the removable nozzle when the removable nozzle is mounted adjacent to the thermally conductive element.

8. The material deposition system of claim 6, wherein the exit cross sectional area of each liquefication zone adjacent to the mixing chamber is less than 0.75 square millimeters, the mixing chamber has a mixing volume that is less than 3 cubic millimeters, and an area of the exit orifice is less than 0.75 square millimeters.

9. An extruder for a three dimensional printer that deposits materials in liquid form, the extruder comprising:
two or more entry ports for the materials of the three dimensional printer;
a mixing chamber for liquefied materials of the three dimensional printer;
a mixing element that fills a substantial portion of the mixing chamber; and
an exit orifice through which the liquefied materials are delivered to an object being printed by the three dimensional printer;
wherein the extruder comprises a thermally conductive element and a removable nozzle, the removable nozzle includes the exit orifice, and the mixing chamber is formed by at least a first surface of the thermally conductive element and a second surface of the removable nozzle when the removable nozzle is mounted adjacent to the thermally conductive element; and
wherein the mixing element, which is separate from the nozzle, comprises a helix that creates a twisted path that is longer than a total length of the mixing chamber.

10. The extruder of claim 9, wherein at least 40% of the mixing chamber is filled by the mixing element.

11. The extruder of claim 9, wherein the mixing element extends from a first side of the mixing chamber to a second side of the mixing chamber.

12. The extruder of claim 9, wherein the deposition materials are thermoplastic materials in filament form, the extruder comprises two or more liquefication zones, each of the liquefication zones being associated with a respective one of the entry ports and each being configured and arranged to deliver a respective liquefied material to the mixing chamber, and wherein each of the liquefication zones has an entry cross sectional area and an exit cross sectional area, and the exit cross sectional area is less than the entry cross sectional area.

13. The extruder of claim 12, wherein each of the liquefication zones has at least one internal cross sectional area that is less than the entry cross sectional area and greater than the exit cross sectional area such that material travelling through the liquefication zone reduces in cross sectional area more than once as it travels from its entry port to the mixing chamber.

14. The extruder of claim 12, wherein the exit cross sectional area of each liquefication zone adjacent to the mixing chamber is less than 0.75 square millimeters, the mixing chamber has a mixing volume that is less than 3 cubic millimeters, and an area of the exit orifice is less than 0.75 square millimeters.

15. An additive manufacturing system comprising:
a build platform; and
an extruder for deposition materials to be applied to a three dimensional (3D) object to be 3D printed in the build platform;
wherein the extruder comprises at least two nozzles of different types, and a first of the at least two nozzles is configured and arranged to dispense multiple materials with a controllable ratio;
wherein the first of the at least two nozzles has an exit orifice with a first exit area, a second of the at least two nozzles has an exit orifice with a second exit area, and the second exit area is different than the first exit area;
wherein the at least two nozzles comprise a third nozzle that has an exit orifice with a third exit area, and the third exit area is different than both the second exit area and the first exit area, such that the second nozzle dispenses material in a finer size than the first nozzle, and the third nozzle dispenses material in a coarser size than the first nozzle;
wherein the at least two nozzles comprise a fourth nozzle, and the extruder comprises a nozzle chassis to which the first nozzle, the second nozzle, the third nozzle and the fourth nozzle attach to move rigidly with each other;
wherein the deposition materials are thermoplastic materials in filament form, and each of the first nozzle, the second nozzle and the third nozzle has a respective independent heating element; and
wherein the first nozzle's heating element has liquefication zones comprising cavities within the first nozzle's heating element, and the first nozzle is a removable nozzle that mounts adjacent to the first nozzle's heating element to form a mixing chamber between the first nozzle's exit orifice and the liquefication zones, the mixing chamber includes a mixing element, and the system comprises a controller coupled with the extruder, the controller configured and arranged to adjust flow rates of multiple input materials to the liquefication zones.

* * * * *